United States Patent
Ko et al.

(10) Patent No.: US 8,422,426 B2
(45) Date of Patent: Apr. 16, 2013

(54) APPARATUS AND METHOD FOR CALIBRATION FOR COOPERATIVE MULTIPLE INPUT MULTIPLE OUTPUT IN A WIRELESS COMMUNICATION SYSTEM

(75) Inventors: Eun-Seok Ko, Seongnam-si (KR); Keun-Chul Hwang, Yongin-si (KR); Eun-Yong Kim, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 352 days.

(21) Appl. No.: 12/791,573

(22) Filed: Jun. 1, 2010

(65) Prior Publication Data
US 2010/0303015 A1      Dec. 2, 2010

(30) Foreign Application Priority Data
Jun. 1, 2009    (KR) .................. 10-2009-0048017

(51) Int. Cl.
*H04W 4/00*           (2009.01)

(52) U.S. Cl.
USPC ........................................... 370/328

(58) Field of Classification Search .......... 370/328, 370/208, 209, 278, 282, 292, 329, 332, 334, 370/338, 342, 335, 349, 389, 432, 441, 491, 370/500, 498, 515; 375/260
See application file for complete search history.

(56) References Cited

U.S. PATENT DOCUMENTS
2005/0041750 A1    2/2005  Lau
2007/0064823 A1*   3/2007  Hwang et al. .................. 375/260

FOREIGN PATENT DOCUMENTS
WO    WO 2009/023825    2/2009

* cited by examiner

*Primary Examiner* — Chi Pham
*Assistant Examiner* — Alexander O Boakye
(74) *Attorney, Agent, or Firm* — The Farrell Law Firm, P.C.

(57) ABSTRACT

A method and apparatus for multi-cell calibration in a wireless communication system supporting cooperative Multiple Input Multiple Output (MIMO) are provided. Operations of a Base Station (BS) according to the method include transmitting a first message indicating a start of multi-cell sounding calibration to a reference Mobile Station (MS); estimating an uplink channel matrix of the reference MS using pilot symbols received from the reference MS; transmitting pilot symbols for enabling the reference MS to estimate a downlink channel matrix; when receiving downlink channel information of cooperative BSs from the reference MS, transmitting second messages comprising the downlink channel information to the cooperative BSs; and determining a multi-cell calibration matrix using the uplink channel matrix and the downlink channel information received from the reference MS.

42 Claims, 7 Drawing Sheets

APPARATUS AND METHOD FOR CALIBRATION FOR COOPERATIVE MULTIPLE INPUT MULTIPLE OUTPUT IN A WIRELESS COMMUNICATION SYSTEM

PRIORITY

The present application claims priority under 35 U.S.C. §119(a) to a Korean patent application filed in the Korean Intellectual Property Office on Jun. 1, 2009, and assigned Ser. No. 10-2009-0048017, the entire content of which is incorporated herein by reference.

BACKGROUND OF THE INVENTION

1. Field of the Invention

The present invention relates generally to a wireless communication system, and more particularly, to an apparatus and a method for calibrating a sounding signal of a mobile station in a wireless communication system supporting a cooperative Multiple Input Multiple Output (MIMO) scheme.

2. Description of the Related Art

Constant efforts have been made to mitigate inter-cell interference in cellular wireless communication systems. Recently, a scheme for reducing inter-cell interference more actively through cooperation of base stations has been under development. Particularly, cooperative Multiple Input Multiple Output (MIMO) schemes, which extend various MIMO schemes applied to a single cell to a plurality of base stations, are suggested. To use the cooperative MIMO scheme, the base stations require channel information of each mobile station. In general, an amount of feedback corresponding to the required channel information is proportional to a performance of the MIMO scheme. Accordingly, to maximize the performance of the cooperative MIMO scheme, a considerable amount of Channel State Information (CSI) feedback is required.

In a Time Division Duplex (TDD) system, base stations can acquire channel information using a sounding training signal without a large amount of data feedback. When a cooperative MIMO scheme is applied, the base stations can simultaneously acquire the channel information using the sounding training signal, which is transmitted only once by the mobile station. Thus, overhead in using the sounding training signal can be greatly reduced. In order for the base stations to use the sounding training signal, calibration for synchronizing transmit and receive Radio Frequency (RF) chains between the base stations and the mobile station must be performed.

The calibration is used to obtain reciprocity between an uplink channel and a downlink channel, and to compensate for a magnitude and phase shift of signals generated in the transmit RF chain and the receive RF chain of a transmitter and a receiver. Hence, when sounding is applied, the calibration must be performed. Various conventional schemes are suggested for performing sounding. However, the conventional calibration schemes target a transmitter and receiver in a single cell, and do not consider sounding performed according to a cooperative MIMO scheme. Even when the calibration is conducted on a per-cell basis according to the conventional calibration schemes, calibration complex constants of base stations participating in a cooperative MIMO differ, and thus, cooperative MIMO performance degrades.

SUMMARY OF THE INVENTION

The present invention is designed to substantially solve at least the above-described problems and/or disadvantages and to provide at least the advantages below. Accordingly, one aspect of the present invention is to provide an apparatus and a method for ensuring reciprocity between an uplink channel and a downlink channel for base stations participating in cooperative Multiple Input Multiple Output (MIMO) to acquire channel information through sounding in a wireless communication system.

Another aspect of the present invention is to provide an apparatus and a method for calibration by taking account of sounding for a cooperative MIMO scheme in a wireless communication system.

Another aspect of the present invention is to provide an apparatus and a method for matching calibration complex constants between base stations participating in cooperative MIMO in a wireless communication system.

Another aspect of the present invention is to provide an apparatus and a method for feeding back downlink channel information of base stations participating in cooperative MIMO in a wireless communication system.

According to one aspect of the present invention, a calibration method of a Base Station (BS) in a wireless communication system supporting cooperative MIMO includes transmitting a first message indicating a start of multi-cell sounding calibration to a reference Mobile Station (MS); estimating an uplink channel matrix of the reference MS using pilot symbols received from the reference MS; transmitting pilot symbols for enabling the reference MS to estimate a downlink channel matrix; when receiving downlink channel information of cooperative BSs from the reference MS, transmitting second messages including the downlink channel information to the cooperative BSs; and determining a multi-cell calibration matrix using the uplink channel matrix and the downlink channel information received from the reference MS.

According to another aspect of the present invention, a calibration method of a BS in a wireless communication system supporting cooperative MIMO includes receiving information of a reference Mobile Station (MS) from a serving BS of the reference MS; estimating an uplink channel matrix of the reference MS using pilot symbols received from the reference MS; transmitting pilot symbols for enabling the reference MS to estimate a downlink channel matrix; and when receiving a message including downlink channel information fed back from the reference MS, from the serving BS, determining a multi-cell calibration matrix using the uplink channel matrix and the downlink channel information.

According to another aspect of the present invention, an operating method of a MS for multi-cell calibration in a wireless communication system supporting cooperative Multiple Input Multiple Output (MIMO includes receiving a message indicating a start of multi-cell sounding calibration from a serving BS; transmitting pilot symbols for enabling cooperative BSs to estimate an uplink channel matrix; estimating downlink channel matrixes of the cooperative BSs using pilot symbols received from the cooperative BSs; and transmitting downlink channel information to the serving BS.

According to another aspect of the present invention, an apparatus of a BS in a wireless communication system supporting cooperative MIMO includes a transmitter for transmitting a first message indicating a start of multi-cell sounding calibration to a reference MS, and transmitting pilot symbols for enabling the reference MS estimates a downlink channel matrix; an estimator for estimating an uplink channel matrix of the reference MS using pilot symbols received from the reference MS; a backhaul communicator for, when receiving downlink channel information of cooperative BSs from the reference MS, transmitting second messages including the downlink channel information to the cooperative BSs; and a controller for determining a multi-cell calibration matrix using the uplink channel matrix and the downlink channel information received from the reference MS.

According to another aspect of the present invention, an apparatus of a BS in a wireless communication system supporting cooperative MIMO includes a backhaul communicator for receiving information of a reference MS from a serving BS of the reference MS; an estimator for estimating an uplink channel matrix of the reference MS using pilot symbols received from the reference MS; a transmitter for transmitting pilot symbols for enabling the reference MS to estimate a downlink channel matrix; and a controller for, when receiving a message including downlink channel information fed back from the reference MS, from the serving BS, determining a multi-cell calibration matrix using the uplink channel matrix and the downlink channel information.

According to another aspect of the present invention, an apparatus of an MS in a wireless communication system supporting cooperative MIMO includes a receiver for receiving a message indicating a start of multi-cell sounding calibration from a serving BS; a transmitter for transmitting pilot symbols for enabling cooperative BSs to estimate an uplink channel matrix; an estimator for estimating downlink channel matrixes of the cooperative BSs using pilot symbols received from the cooperative BSs; and a controller for controlling to transmit downlink channel information to the serving BS.

Other aspects, advantages, and salient features of the invention will become apparent to those skilled in the art from the following detailed description, which, taken in conjunction with the annexed drawings, discloses embodiments of the invention.

BRIEF DESCRIPTION OF THE DRAWINGS

For a more complete understanding of the present disclosure and its advantages, reference is now made to the following description taken in conjunction with the accompanying drawings, in which like reference numerals represent like parts, wherein.

Throughout the drawings, like reference numerals will be understood to refer to like parts, components and structures.

DETAILED DESCRIPTION OF EMBODIMENTS OF THE INVENTION

Embodiments of the present invention will be described herein below with reference to the accompanying drawings. In the following description, well-known functions or constructions are not described in detail since they would obscure the invention in unnecessary detail.

Embodiments of the present invention provide a calibration technique for cooperative Multiple Input Multiple Output (MIMO). Hereinafter, calibration techniques are described with reference to an Orthogonal Frequency Division Multiplexing (OFDM)/Orthogonal Frequency Division Multiple Access (OFDMA) wireless communication system as an example. However, the present invention is also applicable to other wireless communication systems. In OFDM wireless communication systems, since signal characteristics depend on a frequency band, calibration is needed for each frequency band. To ease the understanding of embodiments of the present invention, the calibration technique is explained herein with reference to calibration of only one frequency band, as an example.

The following detailed description includes descriptions of four embodiments of the present invention according to various situations. One embodiment of the present invention uses the completed calibration result of each cell when elements of a channel matrix fed back are designated, another embodiment uses the completed calibration result of each cell when elements of a channel matrix fed back are not designated, still another embodiment allows a Base Station (BS) to determine a reference antenna when the calibration of each cell is not performed, and yet another embodiment allows a Mobile Station (MS) to determine the reference antenna when the calibration of each cell is not performed.

Figure 1:
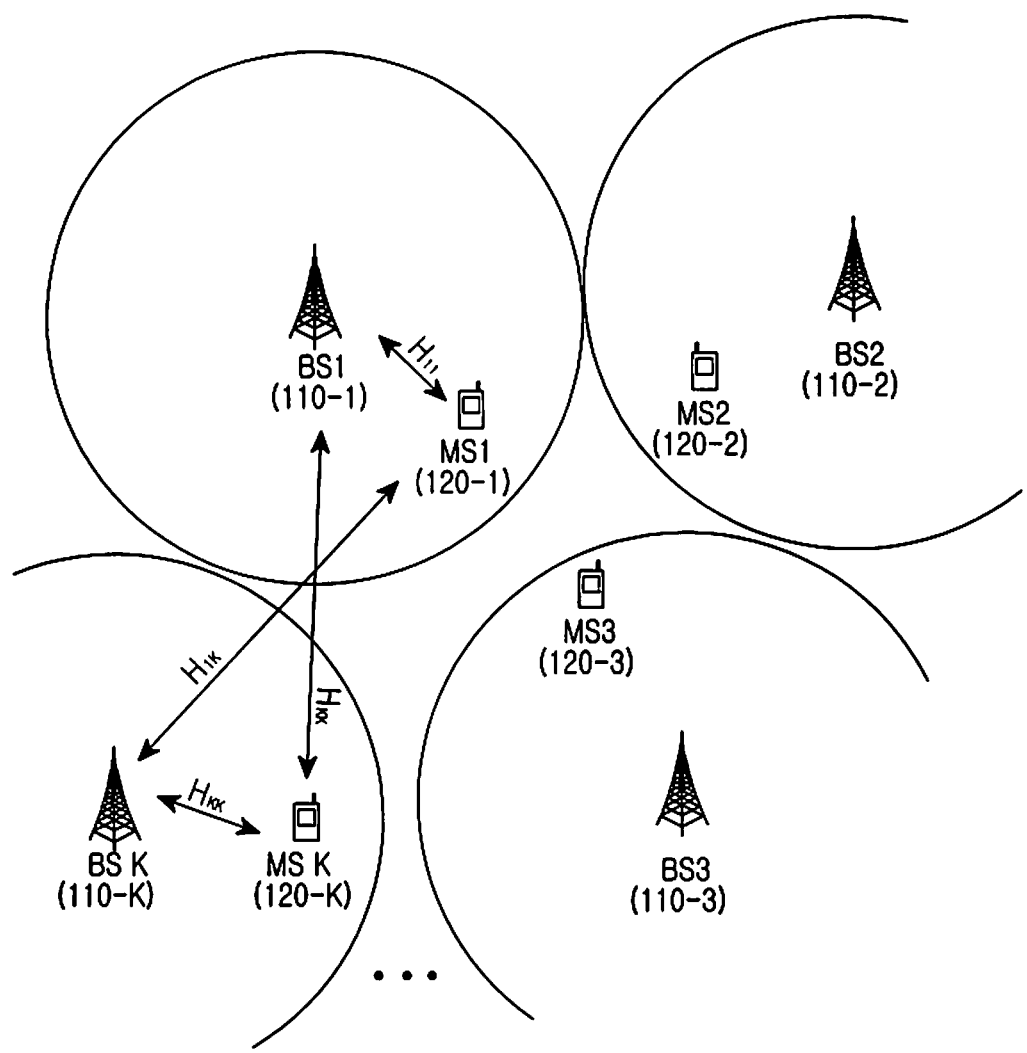
FIG. 1 is a diagram illustrating a wireless communication system including a distribution of BSs and MSs.

Embodiments of the present invention are described according to a wireless communication system such as that illustrated in FIG. 1, as an example. Referring to FIG. 1, the wireless communication system includes K-ary BSs and K-ary MSs. The BS1 110-1 through the BSK 110-K are included within adjacent cells, the MS1 120-1 is connected to the BS1 110-1, and the MSK 120-K is connected to the BSK 110-K. Hereafter, the number of antennas of the BS1 110-1 through the BSK 110-K is expressed as $N_B$, and the number of antennas of the MS1 120-1 through the MSK 120-K is expressed as $N_M$. A channel between the BS1 110-1 and the MS1 120-1 is denoted by $H_{11}$, a channel between the BSK 110-K and the MSK 120-K is denoted by $H_{KK}$, and a channel between the BS1 110-1 and the MSK 120-K is denoted by $H_{K1}$, and a channel between the BSK 110-K and the MS1 120-1 is denoted by $H_{1K}$. The BS1 110-1 through the BSK 110-K participate in a cooperative MIMO scheme. The participation of the BS1 110-1 through the BSK 110-K in the cooperative MIMO scheme does not imply that all of the MS1 120-1 through the MSK 120-K accessing the BSs communicate according to the cooperative MIMO scheme. At least one of the MSs 120-1 through 120-K communicates through the cooperative MIMO scheme. To ease the understanding, a BS participating in the cooperative MIMO scheme is referred to as a cooperative BS.

Figure 2:
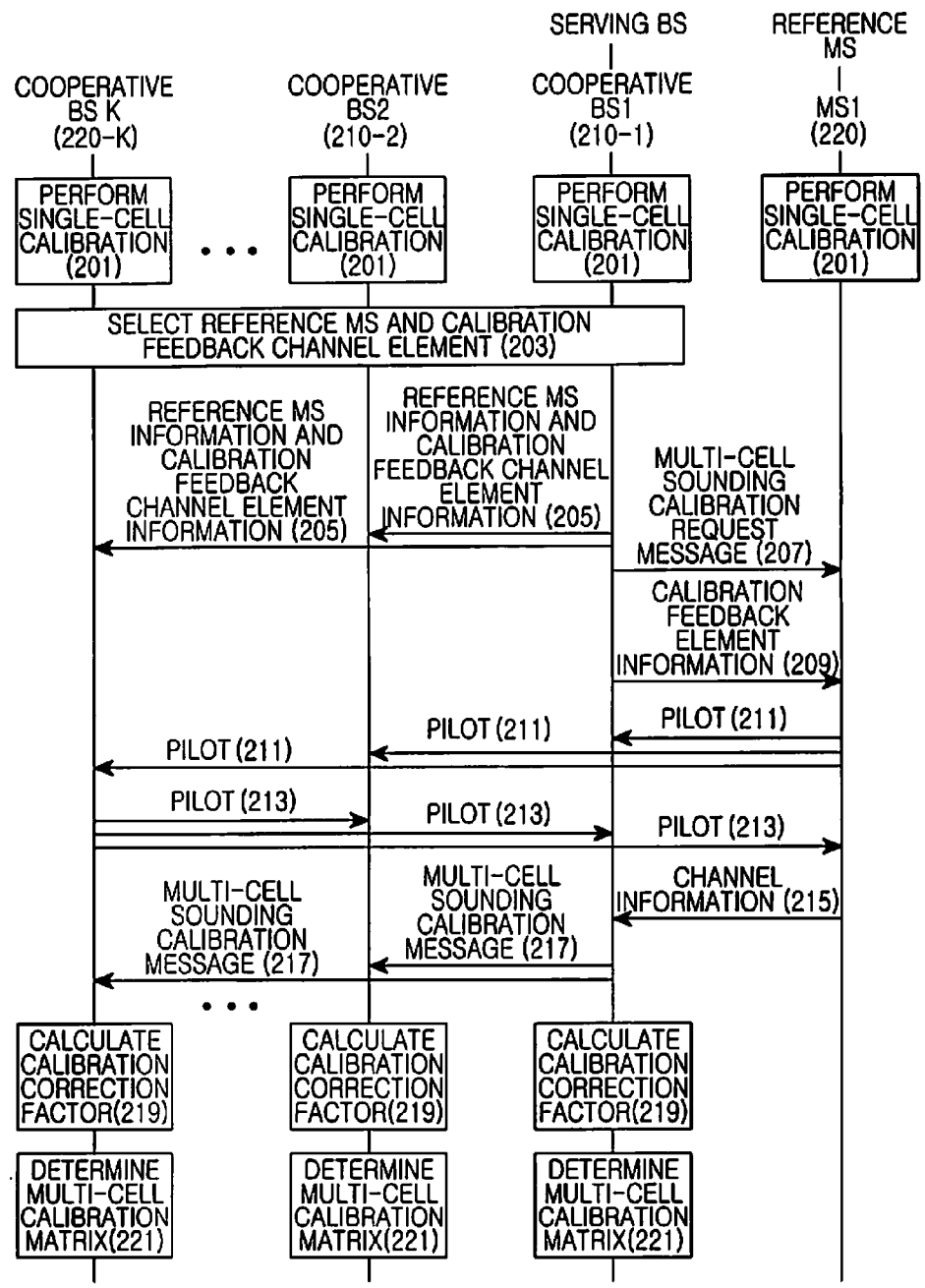
FIG. 2 is a signal flow diagram illustrating a calibration process for cooperative MIMO communication in the wireless communication system according to an embodiment of the present invention.

FIG. 2 is a signal flow diagram illustrating a calibration process for the cooperative MIMO communication in a wireless communication system according to an embodiment of the present invention.

The cooperative BSs 210-1 through 210-K and the MS1 220 conduct a single-cell calibration in step 201. For example, the single-cell calibration conforms to a radio signal based scheme or an internal signal based scheme. The radio signal based scheme utilizes a channel value estimated using signals transmitted and received over the radio channel between the BS and the MS, and the internal signal based scheme utilizes a channel value of a Radio Frequency (RF) chain estimated using signals generated inside the BS and the MS. Using the radio signal based scheme, the cooperative BSs 210-1 through 210-K estimate their uplink channel matrix using a sounding signal and receive a downlink channel matrix fed back from the MS in the cell, and the MS1 220 estimates a downlink channel matrix using a pilot signal, receives the uplink channel matrix from the BS1 210-1, and then calculates a calibration matrix based on Equation 1.

$$C_B(l) = \frac{H_{M \to B}(l, l'_M)}{H_{B \to M}(l'_M, l)} = \frac{\alpha_M(l'_M)\beta_B(l)}{\beta_M(l'_M)\alpha_B(l)}, \quad l = 1, \ldots, N_B \quad (1)$$

$$C_M(l) = \frac{H_{B \to M}(l, l'_B)}{H_{M \to B}(l'_B, l)} = \frac{\alpha_B(l'_B)\beta_M(l)}{\beta_B(l'_B)\alpha_M(l)}, \quad l = 1, \ldots, N_M$$

In Equation 1, $C_B(l)$ denotes an 1-th diagonal element of the calibration matrix of the BS, $C_M(l)$ denotes an 1-th diagonal element of the calibration matrix of the MS, $H_{M \to B}(i,j)$ denotes a (i,j)-th element of the uplink channel matrix between the MS and the BS, $H_{B \to M}(i,j)$ denotes a (i,j)-th element of the downlink channel matrix between the MS and the BS, $l'_M$ denotes a reference antenna index of the MS, $\alpha_M(l)$ denotes an 1-th element of the $N_M \times N_M$-sized diagonal matrix indicating the transmit RF chain characteristics of the MS, $\beta_M(l)$ denotes an 1-th element of the $N_M \times N_M$-sized diagonal matrix indicating the receive RF chain characteristics of the MS, $\alpha_B(l)$ denotes an 1-th element of the $N_B \times N_B$-sized diagonal matrix indicating the transmit RF chain characteristics of the BS, $\beta_B(l)$ denotes an 1-th element of the $N_B \times N_B$-sized diagonal matrix indicating the receive RF chain characteristics of the BS, $N_B$ denotes the number of the antennas of the BS, and $N_M$ denotes the number of the antennas of the MS.

In the single-cell calibration, the calibration matrix of the MS1 220 can be calculated by the MS1 220 itself, or the calibration matrix can be calculated and provided by the cooperative BS 1 210-1. When the calibration matrix of the MS1 220 is calculated by the cooperative BS1 210-1, the calibration matrix transmission from the cooperative BS1 210-1 to the MS1 220 is added.

Using the internal signal based scheme, the cooperative BSs 210-1 through 210-K and the MS1 220 calculate their calibration matrix based on Equation 2.

$$C_B(l) = \frac{H_{LB \to B}(l, 1)}{H_{B \to LB}(1, l)} = \frac{\alpha_{LB}}{\beta_{LB}} \frac{\beta_B(l)}{\alpha_B(l)}, \quad l = 1, \ldots, N_B \quad (2)$$

$$C_M(l) = \frac{H_{LM \to M}(l, 1)}{H_{M \to LM}(1, l)} = \frac{\alpha_{LM}}{\beta_{LM}} \frac{\beta_M(l)}{\alpha_M(l)}, \quad l = 1, \ldots, N_M$$

In Equation 2, $C_B(l)$ denotes the 1-th diagonal element of the calibration matrix of the BS, $C_M(l)$ denotes the 1-th diagonal element of the calibration matrix of the MS, $H_{LB \to B}(i,j)$ and $H_{B \to LB}(i,j)$ denote the (i,j)-th element of the channel matrix between an internal signal generator and the RF chain of the BS, $H_{LM \to M}(i,j)$ and $H_{M \to LM}(i,j)$ denote the (i,j)-th element of the channel matrix between an internal signal generator and the RF chain of the MS, $\alpha_M(l)$ denotes the 1-th element of the $N_M \times N_M$-sized diagonal matrix indicating the transmit RF chain characteristics of the MS, $\beta_M(l)$ denotes the 1-th element of the $N_M \times N_M$-sized diagonal matrix indicating the receive RF chain characteristics of the MS, $\alpha_B(l)$ denotes the 1-th element of the $N_B \times N_B$-sized diagonal matrix indicating the transmit RF chain characteristics of the BS, $\beta_B(l)$ denotes the 1-th element of the $N_B \times N_B$-sized diagonal matrix indicating the receive RF chain characteristics of the BS, $\alpha_{BL}$ and $\beta_{BL}$ denote characteristics of the internal signal generator of the BS, $\alpha_{ML}$ and $\beta_{ML}$ denote characteristics of the internal signal generator of the MS, $N_B$ denotes the number of the antennas of the BS, and $N_M$ denotes the number of the antennas of the MS.

By performing the single-cell calibration, the transmit RF chain and the receive RF chain of the cooperative BSs 210-1 through 210-K and the MS1 220 are calibrated. Hence, the cooperative BSs 210-1 through 210-K can complete the calibration for the cooperative MIMO by determining only a correction factor to be multiplied by the acquired single-cell calibration matrix. Namely, the cooperative BSs 210-1 through 210-K determine a multi-cell calibration matrix by multiplying the correction factor and the single-cell calibration matrix.

The cooperative BSs 210-1 through 210-K select a reference MS for the multi-cell calibration in step 203. The reference MS is selected, according to one of a variety of selection methods from the MSs communicating according to the cooperative MIMO scheme. The reference MS can be selected according to various criteria. For example, the MS expected to exhibit the highest channel estimation accuracy with respect to each cooperative BS can be selected. In this case, an MS having the greatest sum of the receive signal powers for the cooperative BSs and/or the least variance of the power distribution of the receive signals can be selected as the reference MS. One of the cooperative BSs 210-1 through 210-K can select the reference MS by collecting necessary information, or an upper node of the cooperative BSs 210-1 through 210-K can select the reference MS. Upon determining the reference MS, a serving BS of the reference MS is determined. In the present example, the MS1 220 is selected as the reference MS and the BS1 210-1 is determined as the serving BS. After selecting the reference MS 220, the serving BS 210-1 determines a calibration feedback element. The calibration feedback element is the (i,j)-th element of the elements of the downlink channel matrix and denotes a channel coefficient between the i-th antenna of the MS and the j-th antenna of the BS.

After determining the calibration feedback element, the serving BS 210-1 transmits information of the reference MS 220 and the calibration feedback element to the other (K-1)-ary cooperative BSs 210-2 through 210-K over the backhaul in step 205. Herein, the information of the reference MS 220 can include uplink pilot information of the reference MS 220 required for the calibration, pilot information required for the downlink channel estimation of the reference MS 220, and scheduling information. For example, the uplink pilot information of the reference MS 220 includes information relating to the uplink pilot transmission such as resource information, power, and phase shift value of the pilot. The uplink pilot includes the sounding signal. The downlink pilot information of the reference MS 220 and the scheduling include pilot information required in order for the reference MS 220 to estimate the downlink channel of each BS, such as resource information and power of the pilots transmitted by the serving BS 210-1 and the other cooperative BSs 210-2 through 210-K, and resource information allocated for the data delivery of the reference MS 220. Herein, the format of the uplink pilot and the downlink pilot may be set according to the form of pilots defined in the existing standards or newly defined formats.

After the formats of the uplink and downlink pilots are selected, the serving BS 210-1 transmits a multi-cell sounding calibration request message to the reference MS 220 in step 207. Herein, the multi-cell sounding calibration request message informs the reference MS 220 of the start of the multi-cell calibration. The serving BS 210-1 transmits the determined calibration feedback element information to the reference MS 220 in step 209. Herein, the calibration feedback element information is carried by the multi-cell sounding calibration request message so that the serving BS 210-1 can transmit the multi-cell sounding calibration request message and the calibration feedback element information through the single process. Herein, the calibration feedback element information can designate one element or two or more elements. When the plurality of the elements is designated, the elements are determined by the serving BS 210 according to a predefined rule, and the reference MS 220 follows the determination of the serving BS 210-1. To ease the understanding the description of this embodiment of the present invention, the calibration feedback element information is assumed to designate one element as an example.

The reference MS 220, upon receiving the multi-cell sounding calibration request message and the calibration feedback element information, transmits the pilot so that the cooperative BSs 210-1 through 210-K including the serving BS 210-1 can estimate the uplink channel of the reference MS 220 in step 211. Herein, one of the sounding signal, the existing uplink pilot signal, a newly defined uplink pilot signal, or a newly defined sounding signal can be used as the pilot. The pilot is transmitted by applying the calibration matrix of the reference MS 220 acquired using the single-cell calibration. The transmitted signal including the pilot is transmitted, which is multiplied by the calibration matrix of the reference MS 220. Yet, when the single-cell calibration is not performed in order to reduce complexity, the calibration matrix application of the reference MS 220 is omitted. Accordingly, the cooperative BSs 210-1 through 210-K estimate the uplink channel of the reference MS 220. Hereafter, the $N_B \times N_M$-sized uplink channel of the reference MS estimated by the cooperative BSs 210-1 through 210-K is denoted by $\overline{H}_{Ml \rightarrow Bk}$. $\overline{H}_{Ml \rightarrow Bk}$ is produced by multiplying the radio channel and the single-cell calibration matrix of the reference MS according to Equation 3.

$$\overline{H}_{Ml \rightarrow Bk} = H_{Ml \rightarrow Bk} C_{Ml} \qquad (3)$$

In Equation 3, $\overline{H}_{Ml \rightarrow Bk}$ denotes the uplink channel matrix between the reference MS 220 and the k-th cooperative BS 210-k including the calibration matrix, $H_{Ml \rightarrow Bk}$ denotes the uplink channel matrix between the reference MS 220 and the k-th cooperative BS 210-k, and $C_{Ml}$ denotes the single-cell calibration matrix of the reference MS 220.

The cooperative BSs 210-1 through 210-K estimating the uplink channel of the reference MS transmit the pilot so that the reference MS 220 can estimate the downlink channel of each cooperative BS in step 213. Herein, the pilot can use one of the existing downlink pilot signal and a newly defined downlink pilot signal. The transmitted pilot applies the calibration matrix acquired by the cooperative BSs 210-1 through 210-K through the single-cell calibration. Thus, the reference MS 220 estimates the downlink channels to the cooperative BSs 210-1 through 210-K. Hereafter, the $N_M \times N_B$-sized downlink channel of the cooperative BSs 210-1 through 210-K estimated by the reference MS 220 is denoted by $\overline{H}_{Bk \rightarrow Ml}$. $\overline{H}_{Bk \rightarrow Ml}$ is produced by multiplying the radio channel and the single-cell calibration matrix of the cooperative BSs 210-1 through 210-K according to Equation 4.

$$\overline{H}_{Bk \rightarrow Ml} = H_{Bk \rightarrow Ml} C_{Bk} \qquad (4)$$

In Equation 4, $\overline{H}_{Bk \rightarrow Ml}$ denotes the downlink channel matrix between the reference MS 220 and the k-th cooperative BS 210-k including the calibration matrix, $H_{Bk \rightarrow Ml}$ denotes the downlink channel matrix between the reference MS 220 and the k-th cooperative BS 210-k, and $C_{Bk}$ denotes the single-cell calibration matrix of the k-th cooperative BS 210-k.

After the reference MS 220 and the cooperative BSs 210-1 through 210-K estimate the channel matrixes, the reference MS 220 feeds back the (i, j)-th elements designated as the calibration feedback element among the downlink channel matrixes of the cooperative BSs 210-1 through 210-K, to the serving BS 210-1 in step 215. To match only the phase of the calibration complex constant through the calibration for the cooperative MIMO, the reference MS 220 feeds back the phase values of the (i, j)-th elements to the serving BS 210-1. The value of the elements can be processed in various forms for the feedback. For example, the (i, j)-th element values or the phase values can be quantized and then fed back. When the plurality of the elements is designed as the calibration feedback element, the reference MS 220 feeds back the plurality of the elements or the phase values of the elements.

The serving BS 210-1, upon receiving the feedback information from the reference MS 220, transmits multi-cell sounding calibration messages to the other cooperative BSs 210-2 through 210-K in step 217. The multi-cell sounding calibration message includes information for the calibration on the antennas of the other cooperative BSs 210-2 through 210-K, for example, the downlink channel information of the other cooperative BSs 210-2 through 210-K fed back from the reference MS 220. For instance, the multi-cell sounding calibration message transmitted from the k-th cooperative BS 210-k includes the (i, j)-th element value or the phase value of the (i, j)-th element value of the channel matrix of the k-th cooperative BS 210-k fed back from the reference MS 220.

The cooperative BSs 210-1 through 210-K calculate their calibration correction factor in step 219. Before the calculation of the calibration correction factor is explained, the downlink channel matrix between the k-th cooperative BS 210-k and the reference MS 220 with the single-cell calibration applied is determined according to Equation 5.

$$\overline{H}_{Bk \rightarrow Ml} = H_{Bk \rightarrow Ml} C_{Bk} = \gamma_{Bk} E_{RMl} H_{lk} E_{RBk} \qquad (5)$$

In Equation 5, $\overline{H}_{Bk \rightarrow Ml}$ denotes the downlink channel matrix between the reference MS 220 and the k-th cooperative BS 210-k including the calibration matrix, $H_{Bk \rightarrow Ml}$ denotes the downlink channel matrix between the reference MS 220 and the k-th cooperative BS 210-k, $C_{Bk}$ denotes the single-cell calibration matrix of the k-th cooperative BS 210-k, $\gamma_{Bk}$ denotes a complex constant indicating the relation between the transmit RF chain and the receive RF chain of the k-th cooperative BS 210-k after the single-cell calibration matrix is applied, $E_{RMl}$ denotes a characteristic matrix of the receive RF chain of the reference MS 220, $H_{lk}$ denotes the channel matrix between the reference MS 220 and the k-th cooperative BS 210-k, and $E_{RBk}$ denotes a characteristic matrix of the receive RF chain of the k-th cooperative BS 210-k.

The uplink channel matrix between the k-th cooperative BS 210-k and the reference MS 220 with the single-cell calibration applied is determined according to Equation 6.

$$\overline{H}_{Ml \rightarrow Bk} = H_{Ml \rightarrow Bk} C_{Ml} = \gamma_{Ml} E_{RBk} H_{lk}^T E_{RMl} \qquad (6)$$

In Equation 6, $\overline{H}_{Ml \to Bk}$ denotes the uplink channel matrix between the reference MS 220 and the k-th cooperative BS 210-k including the calibration matrix, $H_{Ml \to Bk}$ denotes the uplink channel matrix between the reference MS 220 and the k-th cooperative BS 210-k, $C_{Ml}$ denotes the single-cell calibration matrix of the reference MS 220, $\gamma_{Ml}$ denotes a complex constant indicating the relation between the transmit RF chain and the receive RF chain of the reference MS 220 after the single-cell calibration matrix is applied, $E_{RBk}$ denotes a characteristic matrix of the receive RF chain of the k-th cooperative BS 210-k, $H_{lk}$ denotes the channel matrix between the reference MS 220 and the k-th cooperative BS 210-k, and $E_{RMl}$ denotes a characteristic matrix of the receive RF chain of the reference MS 220.

The correlation between the downlink channel matrix and the uplink channel matrix in Equation 5 and Equation 6 is given by Equation 7.

$$\overline{H}_{Bk \to M1} = \frac{\gamma_{Bk}}{\gamma_{M1}}(\overline{H}_{M1 \to Bk})^T = \gamma_{1k}(\overline{H}_{M1 \to Bk})^T \quad (7)$$

In Equation 7, $\overline{H}_{Bk \to Ml}$ denotes the downlink channel matrix between the reference MS 220 and the k-th cooperative BS 210-k including the calibration matrix, $\gamma_{Bk}$ denotes the complex constant indicating the relation between the transmit RF chain and the receive RF chain of the k-th cooperative BS 210-k after the single-cell calibration matrix is applied, $\gamma_{Ml}$ denotes the complex constant indicating the relation between the transmit RF chain and the receive RF chain of the reference MS 220 after the single-cell calibration matrix is applied, $\overline{H}_{Ml \to Bk}$ denotes the uplink channel matrix between the reference MS 220 and the k-th cooperative BS 210-k including the calibration matrix, and $\gamma_{lk}$ denotes a calibration complex constant between the reference MS 220 and the k-th cooperative BS 210-k.

When receiving the value of the calibration feedback element, to match the phase and the magnitude of the calibration complex constant between the cooperative BSs 210-1 through 210-K, each of the cooperative BSs 210-1 through 210-K including the serving BS 210-1 calculates the calibration correction factor based on Equation 8.

$$\gamma_{Bk}^c = \frac{\overline{H}_{M1 \to Bk}(j, i)}{\overline{H}_{Bk \to M1}(i, j)} = \frac{(H_{M1 \to Bk}C_{M1})(j, i)}{(H_{Bk \to M1}C_{Bk})(i, j)} = \frac{\gamma_{M1}}{\gamma_{Bk}} \quad (8)$$

In Equation 8, $\gamma_{Bk}^c$ denotes the calibration correction factor of the k-th cooperative BS 210-k, $\overline{H}_{Ml \to Bk}(j,i)$ denotes (j, i)-th the element of the uplink channel matrix between the reference MS 220 and the k-th cooperative BS 210-k including the calibration matrix, $\overline{H}_{Bk \to Ml}(i,j)$ denotes the (i, j)-th element of the downlink channel matrix between the reference MS 220 and the k-th cooperative BS 210-k including the calibration matrix, $H_{Ml \to Bk}$ denotes the uplink channel matrix between the reference MS 220 and the k-th cooperative BS 210-k, $C_{Ml}$ denotes the single-cell calibration matrix of the reference MS 220, $H_{Bk \to Ml}$ denotes the downlink channel matrix between the reference MS 220 and the k-th cooperative BS 210-k, $C_{Bk}$ denotes the single-cell calibration matrix of the k-th cooperative BS 210-k, $\gamma_{Bk}$ denotes the complex constant indicating the relation between the transmit RF chain and the receive RF chain of the k-th cooperative BS 210-k after the single-cell calibration matrix is applied, and $\gamma_{Ml}$ denotes the complex constant indicating the relation between the transmit RF chain and the receive RF chain of the reference MS 220 after the single-cell calibration matrix is applied.

When receiving the phase value of the calibration feedback element, to match the phase of the calibration complex constant between the cooperative BSs 210-1 through 210-K, each of the cooperative BSs 210-1 through 210-K including the serving BS 210-1 calculates the correction factor according to Equation 9.

$$\gamma_{Bk}^c = \frac{\exp(j(\text{Phase}(\overline{H}_{M1 \to Bk}(j, i))))}{\exp(j(\text{Phase}(\overline{H}_{Bk \to M1}(i, j))))} \quad (9)$$

$$= \frac{\exp(j(\text{Phase}(H_{M1 \to Bk}C_{M1}(j, i))))}{\exp(j(\text{Phase}(H_{Bk \to M1}C_{Bk}(i, j))))}$$

$$= \frac{\exp(j(\text{Phase}(\gamma_{M1})))}{\exp(j(\text{Phase}(\gamma_{Bk})))}$$

In Equation 9, $\gamma_{Bk}^c$ denotes the calibration correction factor of the k-th cooperative BS 210-k, $\overline{H}_{Ml \to Bk}(j,i)$ denotes the (j, i)-th element of the uplink channel matrix between the reference MS 220 and the k-th cooperative BS 210-k including the calibration matrix, $\overline{H}_{Bk \to Ml}(i,j)$ denotes the (i, j)-th element of the downlink channel matrix between the reference MS 220 and the k-th cooperative BS 210-k including the calibration matrix, $H_{Ml \to Bk}$ denotes the uplink channel matrix between the reference MS 220 and the k-th cooperative BS 210-k, $C_{Ml}$ denotes the single-cell calibration matrix of the reference MS 220, $H_{Bk \to Ml}$ denotes the downlink channel matrix between the reference MS 220 and the k-th cooperative BS 210-k, $C_{Bk}$ denotes the single-cell calibration matrix of the k-th cooperative BS 210-k, $\gamma_{Bk}$ denotes the complex constant indicating the relation between the transmit RF chain and the receive RF chain of the k-th cooperative BS 210-k after the single-cell calibration matrix is applied, and $\gamma_{Ml}$ denotes the complex constant indicating the relation between the transmit RF chain and the receive RF chain of the reference MS 220 after the single-cell calibration matrix is applied.

When the plurality of the elements are designated as the calibration feedback elements, each of the cooperative BSs 210-1 through 210-K including the serving BS 210-1 determines the correction factor by dividing the fed element or the phase value of the fed element by the corresponding element or the phase value of the corresponding element of their downlink channel matrix and filtering the resultant values of the division. Herein, the filtering, such as equalization, for example, enhances the accuracy of the correction factor.

Each of the cooperative BSs 210-1 through 210-K including the serving BS 210-1, upon determining the correction factor, determines the multi-cell calibration matrix by applying the correction factor in step 221. The multi-cell calibration matrix of the cooperative BSs 210-1 through 210-K including the serving BS 210-1 after applying the correction factor determined based on Equation 8 or Equation 9 is determined according to Equation 10.

$$\overline{C}_{Bk} = \gamma_{Bk}^c C_{Bk} \quad (10)$$

In Equation 10, $\overline{C}_{Bk}$ denotes the multi-cell calibration matrix of the k-th cooperative BS 210-k, $\gamma_{Bk}^c$ denotes the calibration correction factor of the k-th cooperative BS 210-k, and $C_{Bk}$ denotes the single-cell calibration matrix of the k-th cooperative BS 210-k.

As indicated above, when the cooperative BSs 210-1 through 210-K correct the calibration matrix by calculating the calibration correction factor, at least one MS communicating according to the cooperative MIMO scheme does not need the separate multi-cell calibration in addition to the single-cell calibration. Thus, the calibration complex constant of the cooperative BSs 210-1 through 210-K for the at least one MS communicating according to the cooperative MIMO scheme remains the same. A determination of whether the calibration complex constant is the same can be performed as follows. When the calibration correction factor for matching the phase and the magnitude is applied, the channel relation between the cooperative BSs 210-1 through 210-K and the reference MS 220 is determined according to Equation 11.

$$H_{Bk \to Ml}\overline{C}_{Bk} = \gamma_{Bk}{}^c\gamma_{Bk}E_{RMl}H_{lk}E_{RBk} = \gamma_{Ml}E_{RMl}H_{lk}E_{RBk} = (H_{Ml \to Bk}C_{Ml})^T \quad (11)$$

In Equation 11, $H_{Bk \to Ml}$ denotes the downlink channel matrix between the reference MS 220 and the k-th cooperative BS 210-k, $\overline{C}_{Bk}$ denotes the multi-cell calibration matrix of the k-th cooperative BS 210-k, $\gamma_{Bk}$ denotes the calibration correction factor of the k-th cooperative BS 210-k, $\gamma_{Bk}$ denotes the complex constant indicating the relation between the transmit RF chain and the receive RF chain of the k-th cooperative BS 210-k after the single-cell calibration matrix is applied, $E_{RMl}$ denotes the characteristic matrix of the receive RF chain of the reference MS 220, $H_{lk}$ denotes the channel matrix between the reference MS 220 and the k-th cooperative BS 210-k, $E_{RBk}$ denotes the characteristic matrix of the receive RF chain of the k-th cooperative BS 210-k, $\gamma_{Ml}$ denotes the complex constant indicating the relation between the transmit RF chain and the receive RF chain of the reference MS 220 after the single-cell calibration matrix is applied, $H_{Ml \to Bk}$ denotes the uplink channel matrix between the reference MS 220 and the k-th cooperative BS 210-k, and $C_{Ml}$ denotes the single-cell calibration matrix of the reference MS 220.

As expressed in Equation 11, the calibration complex constants of the cooperative BSs 210-1 through 210-K for the reference MS 220 are the same. The calibration complex constants of the cooperative BSs 210-1 through 210-K for other MS than the reference MS 220 are the same as well. Although the calibration complex constants of the cooperative BSs 210-1 through 210-K for the different MSs are different from each other, the calibration complex constants of the cooperative BSs 210-1 through 210-K for one MS are the same. Thus, the performance of the cooperative MIMO scheme using the multi-cell sounding is sustained.

When the calibration correction factor for matching only the phase is applied, the channel relation between the cooperative BSs 210-1 through 210-K and the reference MS 220 is determined according to Equation 12.

$$H_{Bk \to Ml}\overline{C}_{Bk} = \gamma_{1k}(H_{Ml \to Bk}C_{Ml})^T, \quad \gamma_{1k} = \gamma_{Bk}^c \frac{\gamma_{Bk}}{\gamma_{Ml}} \quad (12)$$

In Equation 12, $H_{Bk \to Ml}$ denotes the downlink channel matrix between the reference MS 220 and the k-th cooperative BS 210-k, $\overline{C}_{Bk}$ denotes the multi-cell calibration matrix of the k-th cooperative BS 210-k, $\gamma_{1k}$ denotes the calibration complex constant of the k-th cooperative BS 210-k, $H_{Ml \to Bk}$ denotes the uplink channel matrix between the reference MS 220 and the k-th cooperative BS 210-k, $C_{Ml}$ denotes the single-cell calibration matrix of the reference MS 220, $\gamma_{Bk}^c$ denotes the calibration correction factor of the k-th cooperative BS 210-k, $\gamma_{Bk}$ denotes the complex constant indicating the relation between the transmit RF chain and the receive RF chain of the k-th cooperative BS 210-k after the single-cell calibration matrix is applied, and $\gamma_{Ml}$ denotes the complex constant indicating the relation between the transmit RF chain and the receive RF chain of the reference MS 220 after the single-cell calibration matrix is applied.

The phases determined according to Equation 12 can be compared according to Equation 13.

$$\text{Phase}(\gamma_{1k}) = \text{Phase}(\gamma_{Bk}^c) + \text{Phase}(\gamma_{Bk}) - \text{Phase}(\gamma_{Ml}) = 0 \quad (13)$$

In Equation 13, $\gamma_{1k}$ denotes the calibration complex constant of the k-th cooperative BS 210-k, $\gamma_{Bk}^c$ denotes the calibration correction factor of the k-th cooperative BS 210-k, $\gamma_{Bk}$ denotes the complex constant indicating the relation between the transmit RF chain and the receive RF chain of the k-th cooperative BS 210-k after the single-cell calibration matrix is applied, and $\gamma_{Ml}$ denotes the complex constant indicating the relation between the transmit RF chain and the receive RF chain of the reference MS 220 after the single-cell calibration matrix is applied.

As expressed in Equation 13, since Equation 13 is valid for every k, the phases of the calibration complex constants of every cooperative BS 210-1 through 210-K for the reference MS 220 are the same.

Figure 3:
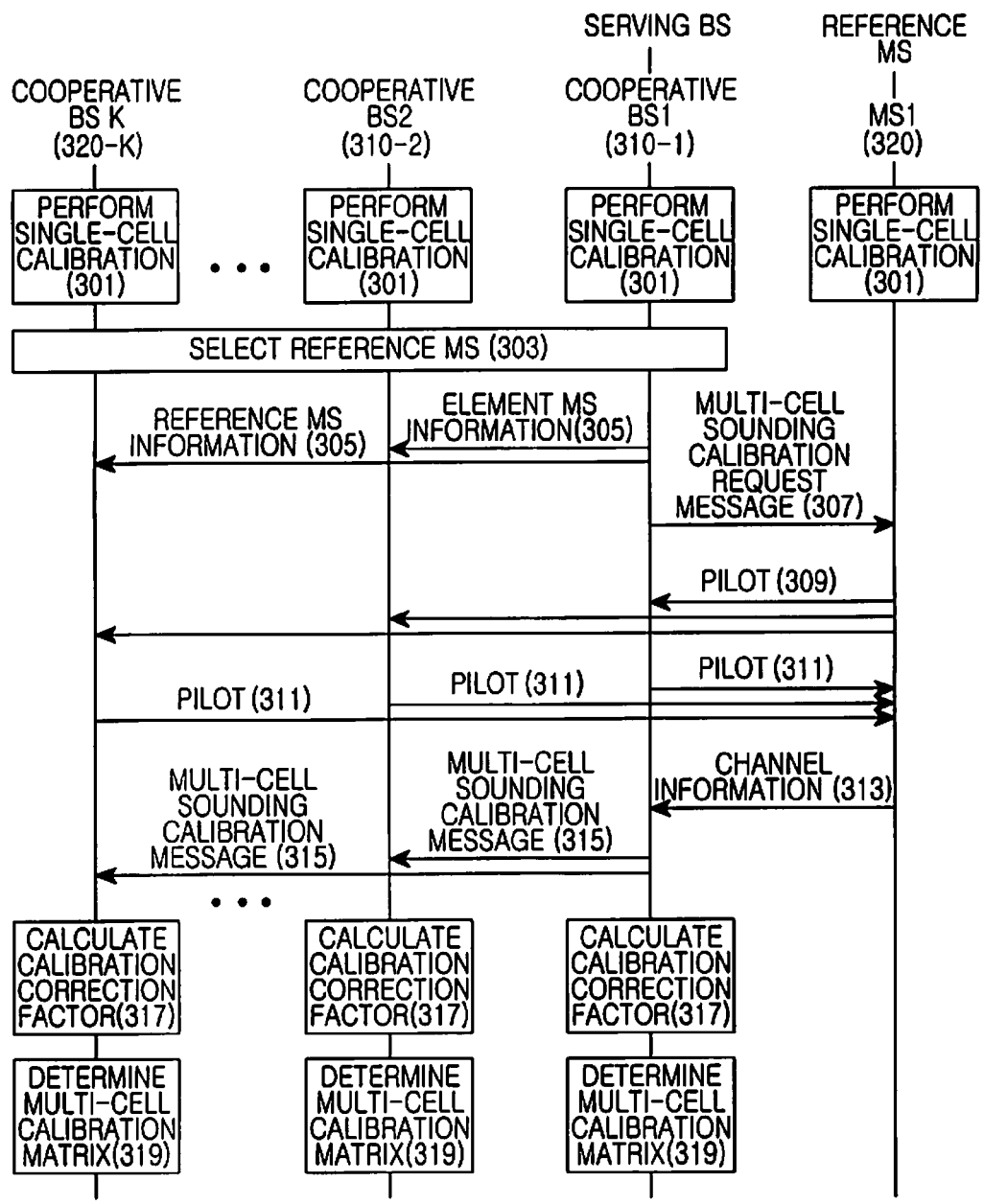
FIG. 3 is a signal flow diagram illustrating a calibration process for cooperative MIMO communication in the wireless communication system according to another embodiment of the present invention.

FIG. 3 is a signal flow diagram illustrating a calibration process for cooperative MIMO communication in a wireless communication system according to another embodiment of the present invention.

The cooperative BSs 310-1 through 310-K and the MS1 320 conduct single-cell calibration in step 301. For example, the single-cell calibration may be either one of a radio signal based scheme or an internal signal based scheme. The radio signal based scheme utilizes a channel value estimated based on the signals transmitted and received over the radio channel between the BS and the MS, and the internal signal based scheme utilizes a channel value of the RF chain estimated based on the signals generated inside the BS and the MS. In the single-cell calibration, the calibration matrix of the MS1 320 can be calculated by the MS1 320 itself, or calculated and provided from the cooperative BS1 310-1. When the calibration matrix of the MS1 320 is calculated by the cooperative BS1 310-1, the calibration matrix transmission from the cooperative BS1 310-1 to the MS1 320 is added.

After the single-cell calibration, the cooperative BSs 310-1 through 310-K select the reference MS for the multi-cell calibration in step 303. The reference MS is selected from the MSs communicating according to the cooperative MIMO scheme. The reference MS can be selected according to various criteria. For example, the MS expected to exhibit the highest channel estimation accuracy with respect to each cooperative BS can be selected. In this case, an MS having the greatest sum of the receive signal powers for the cooperative BSs and/or the least variance of the power distribution of the receive signals can be selected as the reference MS. One of the cooperative BSs 310-1 through 310-K can select the reference MS by collecting necessary information, or an upper node of the cooperative BSs 310-1 through 310-K can select the reference MS. Upon determining the reference MS, the serving BS of the reference MS is determined. In the present example, the MS1 320 is selected as the reference MS and the BS1 310-1 is determined as the serving BS.

After selecting the reference MS 320, the serving BS 310-1 transmits information of the reference MS 320 to the other (K-1)-ary cooperative BSs 310-2 through 310-K through the backhaul in step 305. Herein, the information of the reference MS 320 can include uplink pilot information of the reference MS 320 required for the calibration, pilot information required for the downlink channel estimation of the reference MS 320, and scheduling information. For example, the uplink pilot information of the reference MS 320 includes information relating to the uplink pilot transmission such as resource information, power, and phase shift value of the pilot. The uplink pilot includes the sounding signal. The downlink pilot information of the reference MS 320 and the scheduling information include pilot information required in order for the reference MS 320 to estimate the downlink channel of each BS, such as resource information and power of the pilots transmitted by the serving BS 310-1 and the other cooperative BSs 310-2 through 310-K, and resource information allocated for the data delivery of the reference MS 320. Herein, the format of the uplink pilot and the downlink pilot employ the form of pilots defined in the existing standards, or may be newly defined.

In step 307, the serving BS 310-1 transmits a multi-cell sounding calibration request message to the reference MS 320. Herein, the multi-cell sounding calibration request message informs the reference MS 320 of the start of the multi-cell calibration. The reference MS 320, upon receiving the multi-cell sounding calibration request message, transmits the pilot so that the cooperative BSs 310-1 through 310-K including the serving BS 310-1 can estimate the uplink channel of the reference MS 320 in step 309. Herein, one of the sounding signal, the existing uplink pilot signal, a newly defined uplink pilot signal, or a newly defined sounding signal can be used as the pilot. The pilot is transmitted by applying the calibration matrix of the reference MS 320 acquired by using the single-cell calibration. Yet, when the single-cell calibration is not performed for the sake of the complexity decrease, the calibration matrix application of the reference MS 320 is omitted. Accordingly, the cooperative BSs 310-1 through 310-K estimate the uplink channel $\overline{H}_{Ml \to Bk}$ of the reference MS 320. $\overline{H}_{Ml \to Bk}$ is acquired by multiplying the radio channel and the single-cell calibration matrix of the reference MS, and is given by Equation 3.

The cooperative BSs 310-1 through 310-K estimating the uplink channel of the reference MS 320 transmit the pilot so that the reference MS 320 can estimate the downlink channels of the cooperative BSs 310-1 through 310-K in step 311. Herein, the pilot can use one of the existing downlink pilot signal and a newly defined downlink pilot signal. The transmitted pilot applies the calibration matrix acquired by the cooperative BSs 310-1 through 310-K through the single-cell calibration. Thus, the reference MS 320 estimates the downlink channels $\overline{H}_{Bk \to Ml}$ of the cooperative BSs 310-1 through 310-K. $\overline{H}_{Bk \to Ml}$ is acquired by multiplying the radio channel and the single-cell calibration matrix of the cooperative BSs 310-1 through 310-K, and is given by Equation 4.

After the reference MS 320 and the cooperative BSs 310-1 through 310-K estimate the channel matrixes, the reference MS 320 feeds back calibration feedback channel information indicating the downlink channel matrixes of the cooperative BSs 310-1 through 310-K to the serving BS 310 in step 313. Herein, the calibration feedback channel information indicates a representative value of the downlink channel matrix acquired using a particular predefined function. Hereafter, the calibration feedback channel information is determined according to $H_{Bk}^c (=f(\overline{H}_{Bk \to Ml}))$. For example, $H_{Bk}^c$ can be determined by averaging the elements of the channel matrix, and is given by Equation 14.

$$H_{Bk}^c = \frac{1}{N_M N_B} \sum_{i=1}^{N_M} \sum_{j=1}^{N_B} \overline{H}_{Bk \to M1}(i, j) \tag{14}$$

$$= \gamma_{Bk} \left( \frac{1}{N_M N_B} \sum_{i=1}^{N_M} \sum_{j=1}^{N_B} (E_{RM1} H_{1k} E_{RBk})(i, j) \right)$$

In Equation 14, $H_{Bk}^c$ denotes the calibration feedback channel information, $N_M$ denotes the number of the antennas of the MS, $N_B$ denotes the number of the antennas of the BS, $\overline{H}_{Bk \to Ml}(i,j)$ denotes an (i, j)-th element of the downlink channel matrix between the reference MS 320 and the k-th cooperative BS 310-k including the calibration matrix, $\gamma_{Bk}$ denotes the complex constant indicating the relation between the transmit RF chain and the receive RF chain of the k-th cooperative BS 310-k after the single-cell calibration matrix is applied, $E_{RMl}$ denotes the characteristic matrix of the receive RF chain of the reference MS 320, $H_{lk}$ denotes the channel matrix between the reference MS 320 and the k-th cooperative BS 310-k, and $E_{RBk}$ denotes the characteristic matrix of the receive RF chain of the k-th cooperative BS 310-k.

To match only the phase of the calibration complex constant through the calibration for the cooperative MIMO, the reference MS 320 feeds back the phase values of $H_{Bk}^c (=H_{Bl}^c)$ of the serving BS 310-1 and $H_{Bk}^c$ of the other cooperative BSs 310-2 through 310-K to the serving BS 310-1.

The serving BS 310-1, which receives the feedback information from the reference MS 320, transmits multi-cell sounding calibration messages to the other cooperative BSs 310-2 through 310-K in step 315. The multi-cell sounding calibration message includes information for the calibration on the antennas of the other cooperative BSs 310-2 through 310-K, for example, $H_{Bk}^c$ or the phase value of $H_{Bk}^c$ fed back from the reference MS 320. Hence, each of the cooperative BSs 310-1 through 310-K calculates the calibration correction factor in step 317. Using $H_{Bk}^c$, each of the cooperative BSs 310-1 through 310-K including the serving BS 310-1 calculates the calibration correction factor based on Equation 15.

$$\gamma_{Bk}^c = \frac{\frac{1}{N_M N_B} \sum_{i=1}^{N_M} \sum_{j=1}^{N_B} \overline{H}_{M1 \to Bk}(i, j)}{H_{Bk}^c} = \frac{\gamma_{M1}}{\gamma_{Bk}} \tag{15}$$

In Equation 15, $\gamma_{Bk}^c$ denotes the calibration correction factor of the k-th cooperative BS 310-k, $N_M$ denotes the number of the antennas of the MS, $N_B$ denotes the number of the antennas of the BS, $\overline{H}_{Ml \to Bk}(i,j)$ denotes an (i, j)-th element of the uplink channel matrix between the reference MS 320 and the k-th cooperative BS 310-k including the calibration matrix, $H_{Bk}^c$ denotes the calibration feedback channel information, $\gamma_{Bk}$ denotes the complex constant indicating the relation between the transmit RF chain and the receive RF chain of the k-th cooperative BS 310-k after the single-cell calibration matrix is applied, and $\gamma_{Ml}$ denotes the complex constant indicating the relation between the transmit RF chain and the receive RF chain of the reference MS 320 after the single-cell calibration matrix is applied.

Using the phase value of $H_{Bk}^c$, each of the cooperative BSs 310-1 through 310-K including the serving BS 310-1 calculates the calibration correction factor based on Equation 16.

$$\gamma_{Bk}^C = \frac{\exp\left(j\left(\text{Phase}\left(\sum_{i=1}^{N_M}\sum_{j=1}^{N_B}\overline{H}_{M1\rightarrow Bk}(i,j)\right)\right)\right)}{\exp(j(\text{Phase}(H_{Bk}^c)))} = \frac{\exp(j(\text{Phase}(\gamma_{M1})))}{\exp(j(\text{Phase}(\gamma_{Bk})))} \quad (16)$$

In Equation 16, $\gamma_{Bk}^c$ denotes the calibration correction factor of the k-th cooperative BS 310-k, $N_M$ denotes the number of the antennas of the MS, $N_B$ denotes the number of the antennas of the BS, $\overline{H}_{M1\rightarrow Bk}(i,j)$ denotes the (i, j)-th element of the uplink channel matrix between the reference MS 320 and the k-th cooperative BS 310-k including the calibration matrix, $H_{Bk}^c$ denotes the calibration feedback channel information, $\gamma_{Bk}$ denotes the complex constant indicating the relation between the transmit RF chain and the receive RF chain of the k-th cooperative BS 310-k after the single-cell calibration matrix is applied, and $\gamma_{M1}$ denotes the complex constant indicating the relation between the transmit RF chain and the receive RF chain of the reference MS 320 after the single-cell calibration matrix is applied.

In step 319, each of the cooperative BSs 310-1 through 310-K determines the multi-cell calibration matrix based on Equation 10 by using the correction factor calculated based on Equation 15 or Equation 16. The cooperative BSs 310-1 through 310-K determine the multi-cell calibration matrix by multiplying the calibration matrix acquired from the single-cell calibration and the calibration correction factor.

Figure 4:
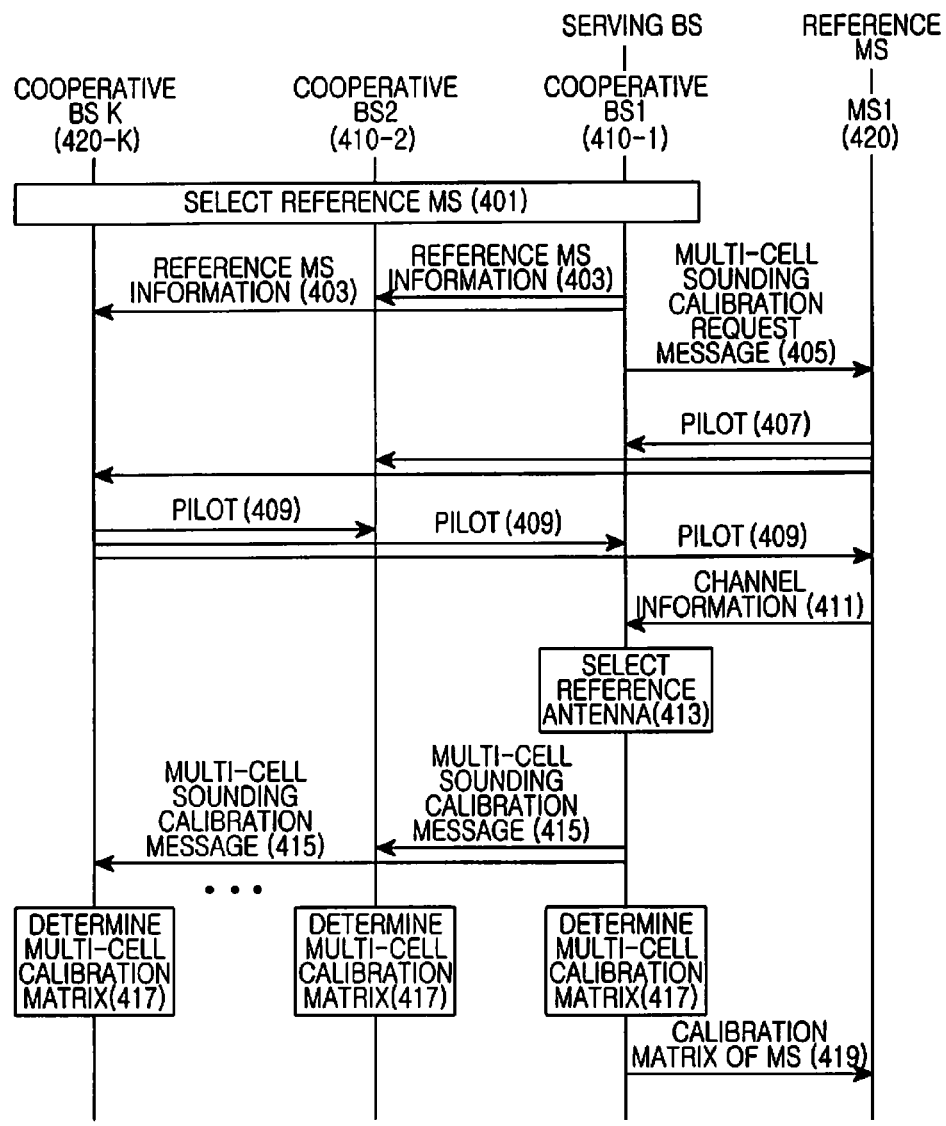
FIG. 4 is a signal flow diagram illustrating a calibration process for cooperative MIMO communication in a wireless communication system according to still another embodiment of the present invention.

FIG. 4 is a signal flow diagram illustrating a calibration process for cooperative MIMO communication in a wireless communication system according to still another embodiment of the present invention.

The cooperative BSs 410-1 through 410-K select the reference MS for the multi-cell calibration in step 401. The reference MS is selected from the MSs communicating according to the cooperative MIMO scheme. The reference MS can be selected according to various criteria. For example, the MS expected to exhibit the highest channel estimation accuracy with respect to each cooperative BS can be selected. In this case, an MS having the greatest sum of the receive signal powers for the cooperative BSs and/or the least variance of the power distribution of the receive signals can be selected as the reference MS. One of the cooperative BSs 410-1 through 410-K can select the reference MS by collecting necessary information, or an upper node of the cooperative BSs 410-1 through 410-K can select the reference MS. Upon determining the reference MS, the serving BS of the reference MS is determined. In the present example, the MS1 420 is selected as the reference MS and the BS1 410-1 is determined as the serving BS.

The serving BS 410-1 transmits information of the reference MS 420 to the other (K-1)-ary cooperative BSs 410-2 through 410-K through the backhaul in step 403. Herein, the information of the reference MS 420 can include uplink pilot information of the reference MS 420 required for the calibration, pilot information required for the downlink channel estimation of the reference MS 420, and scheduling information. For example, the uplink pilot information of the reference MS 420 includes information relating to the uplink pilot transmission such as resource information, power, and phase shift value of the pilot. The uplink pilot includes the sounding signal. The downlink pilot information of the reference MS 420 and the scheduling information include pilot information required for the reference MS 420 to estimate the downlink channel of each BS, such as resource information and power of the pilots transmitted by the serving BS 410-1 and the other cooperative BSs 410-2 through 410-K, and resource information allocated for the data delivery of the reference MS 420. Herein, the format of the uplink pilot and the downlink pilot employ the form of pilots defined in the existing standards, or may be newly defined.

In step 405, the serving BS 410-1 transmits a multi-cell sounding calibration request message to the reference MS 420. Herein, the multi-cell sounding calibration request message informs the reference MS 420 of the start of the multi-cell calibration. The reference MS 420, upon receiving the multi-cell sounding calibration request message, transmits the pilot so that the cooperative BSs 410-1 through 410-K including the serving BS 410-1 can estimate the uplink channel of the reference MS 420 in step 407. Herein, one of the sounding signal, the existing uplink pilot signal, a newly defined uplink pilot signal, or a newly defined sounding signal can be used as the pilot. Accordingly, the cooperative BSs 410-1 through 410-K estimate the uplink channel of the reference MS 420. Hereafter, the $N_B \times N_M$-sized uplink channel of the reference MS 420 estimated by the cooperative BSs 410-1 through 410-K is denoted by $\overline{H}_{M1\rightarrow Bk}$.

The cooperative BSs 410-1 through 410-K estimating the uplink channel of the reference MS 420 transmit the pilot so that the reference MS 420 can estimate the downlink channel of each cooperative BS 410-1 through 410-K in step 409. Herein, the pilot can use one of the existing downlink pilot signal and a newly defined downlink pilot signal. Thus, the reference MS 420 estimates the downlink channels of the cooperative BSs 410-1 through 410-K. Hereafter, the $N_M \times N_B$-sized downlink channel of the cooperative BSs 410-1 through 410-K estimated by the reference MS 420 is denoted by $\overline{H}_{Bk\rightarrow M1}$.

After the reference MS 420 and the cooperative BSs 410-1 through 410-K estimate the channel matrixes, the reference MS 420 feeds back downlink channel information of the cooperative BSs 410-1 through 410-K to the serving BS 410 in step 411. For the feedback, the downlink channel can be processed in various forms. For example, the elements of the channel matrix can be quantized and then fed back.

The serving BS 410-1, upon receiving the fed back downlink channel information, selects a reference antenna of the reference MS 420 by using the downlink channel matrixes in step 413. Herein, an index of the reference antenna is denoted by $l'_{M1}$. The reference antenna is the criterion for determining the calibration matrix. The antenna having the greatest average reception gain can be selected as the reference antenna. The downlink channel matrixes and the uplink channel matrix estimated by the serving BS 410-1 may be used together.

The serving BS 410-1 selecting the reference antenna transmits multi-cell sounding calibration messages to the other cooperative BSs 410-2 through 410-K in step 415. The multi-cell sounding calibration message includes information for the calibration on the antennas of the other cooperative BSs 410-2 through 410-K, for example, the index information of the reference antenna and the downlink channel information estimated by the reference MS 420. More specifically, the multi-cell sounding calibration message transmitted to the k-th cooperative BS 410-k includes $H_{Bk\rightarrow M1}$ and $l'_{M1}$, or the $l'_{M1}$-th row of $H_{Bk\rightarrow M1}$ and $l'_{M1}$. When the $l'_{M1}$-th row of $H_{Bk\rightarrow M1}$ and $l'_{M1}$ are contained, the capacity of the multi-cell sounding calibration message is relatively small and thus the backhaul overhead reduces.

In step 417, the other cooperative BSs 410-2 through 410-K and the serving BS 410-1, upon receiving the multi-cell sounding calibration message, determine the calibration matrix based on Equation 17.

$$C_{Bk}(l) = \frac{H_{M1 \to Bk}(l, l'_{M1})}{H_{Bk \to M1}(l'_{M1}, l)} = \frac{\alpha_{M1}(l'_{M1})\beta_{Bk}(l)}{\beta_{M1}(l'_{M1})\alpha_{Bk}(l)}, \quad l = 1, \ldots, N_B \quad (17)$$

In Equation 17, $C_{Bk}(l)$ denotes the l-th diagonal element of the multi-cell calibration matrix of the k-th cooperative BS 410-k, $H_{M1 \to Bk}(i,j)$ denotes the (i, j)-th element of the uplink channel matrix between the reference MS 420 and the k-th cooperative BS 410-k, $H_{Bk \to M1}(i,j)$ denotes the (i, j)-th element of the downlink channel matrix between the reference MS 420 and the k-th cooperative BS 410-k, $l'_{M1}$ denotes the reference antenna index, $\alpha_{M1}(l)$ denotes the l-th element of the $N_M \times N_M$-sized diagonal matrix indicating the transmit RF chain characteristics of the reference MS 420, $\beta_{M1}(l)$ denotes the l-th element of the $N_M \times N_M$-sized diagonal matrix indicating the receive RF chain characteristics of the reference MS 420, $\alpha_{Bk}(l)$ denotes the l-th element of the $N_B \times N_B$-sized diagonal matrix indicating the transmit RF chain characteristics of the k-th cooperative BS 410-k, $\beta_{Bk}(l)$ denotes the l-th element of the $N_B \times N_B$-sized diagonal matrix indicating the receive RF chain characteristics of the k-th cooperative BS 410-k, and $N_B$ denotes the number of the antennas of the k-th cooperative BS 410-k.

After determining the calibration matrix of the reference MS 420 based on Equation 18, the serving BS 410-1 transmits the calibration matrix of the reference MS 420 to the reference MS 420 in step 419.

$$C_{M1}(l) = \frac{H_{B1 \to M1}(l, l'_{B1})}{H_{M1 \to B1}(l'_{B1}, l)} = \frac{\alpha_{B1}(l'_{B1})\beta_{M1}(l)}{\beta_{B1}(l'_{B1})\alpha_{M1}(l)}, \quad l = 1, \ldots, N_M \quad (18)$$

In Equation 18, $C_{M1}(l)$ denotes the l-th diagonal element of the multi-cell calibration matrix of the reference MS 420, $H_{B1 \to M1}(i,j)$ denotes the (i, j)-th element of the downlink channel matrix between the reference MS 420 and the serving BS 410-1, $H_{M1 \to B1}(i,j)$ denotes the (i, j)-th element of the uplink channel matrix between the reference MS 420 and the serving BS 410-1, $l'_{M1}$ denotes the reference antenna index, $\alpha_{M1}(l)$ denotes the l-th element of the $N_M \times N_M$-sized diagonal matrix indicating the transmit RF chain characteristics of the reference MS 420, $\beta_{M1}(l)$ denotes the l-th element of the $N_M \times N_M$-sized diagonal matrix indicating the receive RF chain characteristics of the reference MS 420, $\alpha_{B1}(l)$ denotes the l-th element of the $N_B \times N_B$-sized diagonal matrix indicating the transmit RF chain characteristics of the serving BS 410-1, $\beta_{B1}(l)$ denotes the l-th element of the $N_B \times N_B$-sized diagonal matrix indicating the receive RF chain characteristics of the serving BS 410-1, and $N_M$ denotes the number of the antennas of the reference MS 420.

Although it is not depicted in FIG. 4, the calibration matrix of the MSs connected to the other cooperative BSs 410-2 through 420-K, excluding the serving BS 410-1 and communicating according to the cooperative MIMO scheme, is determined by the single-cell calibration process.

The channel relation between the cooperative BSs 410-1 through 410-K and the reference MS 420 as determined above is given by Equation 19.

$$H_{Bk \to M1}C_{Bk} = \gamma_{1k}(H_{M1 \to Bk}C_{M1})^T, \quad \gamma_{1k} = \frac{\alpha_{B1}(l'_{B1})}{\beta_{B1}(l'_{B1})} \frac{\beta_{M1}(l'_{M1})}{\alpha_{M1}(l'_{M1})} \quad (19)$$

In Equation 19, $H_{Bk \to M1}$ denotes the downlink channel matrix between the reference MS 420 and the k-th cooperative BS 410-k, $C_{Bk}$ denotes the multi-cell calibration matrix of the k-th cooperative BS 410-k, $\gamma_{1k}$ denotes the calibration complex constant of the k-th cooperative BS 410-k, $H_{M1 \to Bk}$ denotes the uplink channel matrix between the reference MS 420 and the k-th cooperative BS 410-k, $C_{M1}$ denotes the multi-cell calibration matrix of the reference MS 420, $\alpha_{M1}(l)$ denotes the l-th element of the $N_M \times N_M$-sized diagonal matrix indicating the transmit RF chain characteristics of the reference MS 420, $\beta_{M1}(l)$ denotes the l-th element of the $N_M \times N_M$-sized diagonal matrix indicating the receive RF chain characteristics of the reference MS 420, $\alpha_{B1}(l)$ denotes the l-th element of the $N_B \times N_B$-sized diagonal matrix indicating the transmit RF chain characteristics of the serving BS 410-1, $\beta_{B1}(l)$ denotes the l-th element of the $N_B \times N_B$-sized diagonal matrix indicating the receive RF chain characteristics of the serving BS 410-1, $l'_{B1}$ denotes the reference antenna index of the serving BS 410-1, and $l'_{M1}$ denotes the reference antenna index of the reference MS 420.

As expressed in Equation 19, Equation 19 is valid for every k. Thus, the calibration complex constants of all of the cooperative BSs 410-1 through 410-K for the reference MS 420 are the same. The calibration complex constants of the cooperative BSs 410-1 through 410-K for other MSs than the reference MS 420 are the same, i.e., although the calibration complex constants of the cooperative BSs 410-1 through 410-K for the different MSs are different from each other, the calibration complex constants of the cooperative BSs 410-1 through 410-K for one MS are the same. Therefore, the performance of the cooperative MIMO scheme using the multi-cell sounding is sustained.

Figure 5:
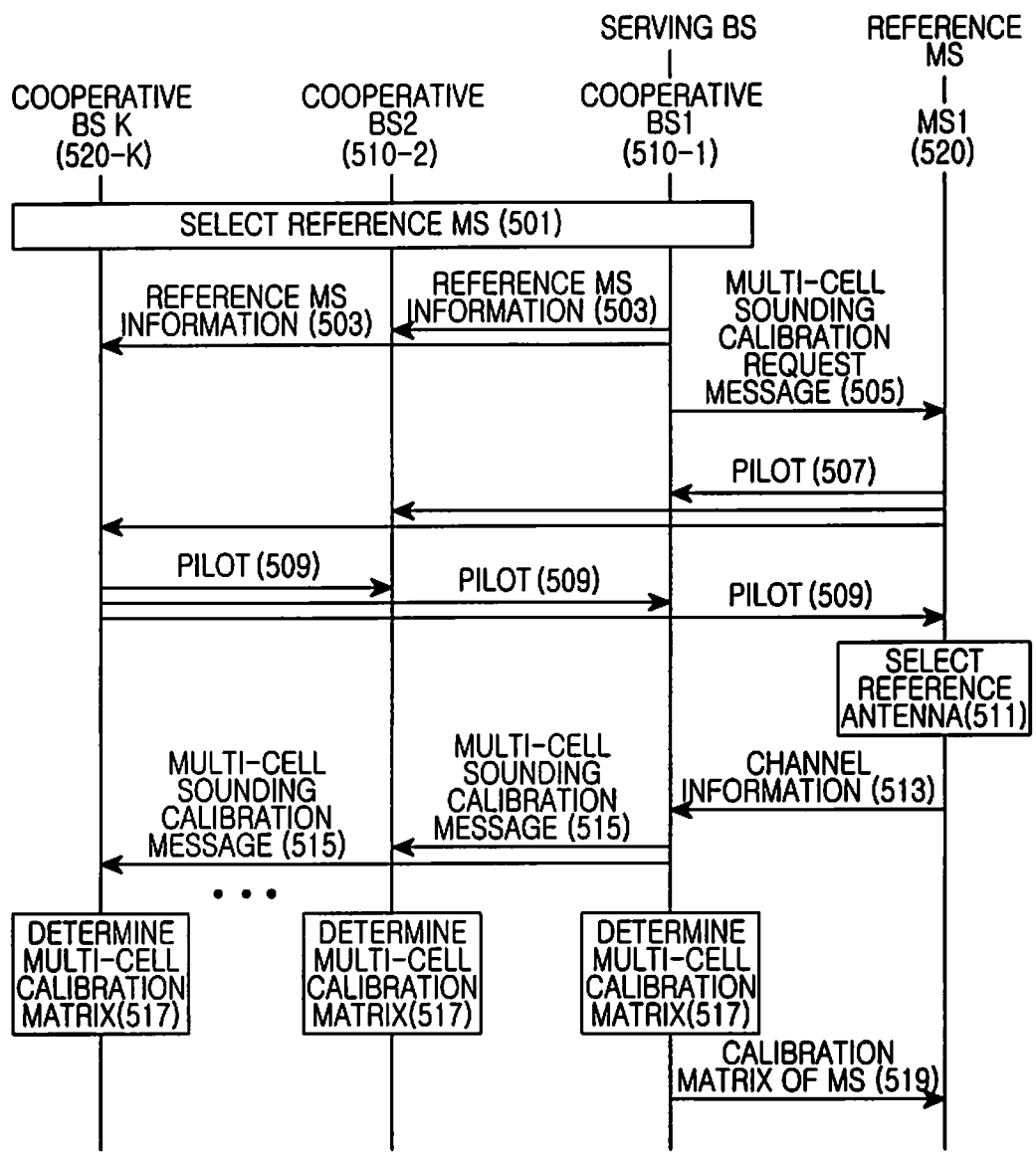
FIG. 5 is a signal flow diagram illustrating a calibration process for cooperative MIMO communication in a wireless communication system according to yet another embodiment of the present invention.

FIG. 5 is a signal flow diagram illustrating a calibration process for cooperative MIMO communication in a wireless communication system according to yet another embodiment of the present invention.

The cooperative BSs 510-1 through 510-K select the reference MS for the multi-cell calibration in step 501. The reference MS is selected from the MSs communicating according to the cooperative MIMO scheme. The reference MS can be selected according to various criteria. For example, the MS expected to exhibit the highest channel estimation accuracy with respect to each cooperative BS 510-1 through 510-K can be selected. In this case, an MS having the greatest sum of the receive signal powers for the cooperative BSs 510-1 through 510-K and/or the least variance of the power distribution of the receive signals can be selected as the reference MS. One of the cooperative BSs 510-1 through 510-K can select the reference MS by collecting necessary information, or an upper node of the cooperative BSs 510-1 through 510-K can select the reference MS. Upon determining the reference MS, the serving BS of the reference MS is determined. In the present example, the MS1 520 is selected as the reference MS and the BS1 510-1 is determined as the serving BS.

The serving BS 510-1 transmits information of the reference MS 520 to the other (K-1)-ary cooperative BSs 510-2 through 510-K through the backhaul in step 503. Herein, the information of the reference MS 520 can include uplink pilot information of the reference MS 520 required for the calibration, pilot information required for the downlink channel estimation of the reference MS 520, and scheduling information. For example, the uplink pilot information of the reference MS 520 includes information relating to the uplink pilot transmission such as resource information, power, and phase shift value of the pilot. The uplink pilot includes the sounding signal. The downlink pilot information of the reference MS 520 and the scheduling information include pilot information required in order for the reference MS 520 to estimate the downlink channel of each BS, such as resource information and power of the pilots transmitted by the serving BS 510-1 and the other cooperative BSs 510-2 through 510-K, and resource information allocated for the data delivery of the reference MS 520. Herein, the format of the uplink pilot and the downlink pilot employ the form of pilots defined in the existing standards, or may be newly defined.

In step 505, the serving BS 510-1 transmits a multi-cell sounding calibration request message to the reference MS 520. Herein, the multi-cell sounding calibration request message informs the reference MS 520 of the start of the multi-cell calibration. The reference MS 520, upon receiving the multi-cell sounding calibration request message, transmits the pilot so that the cooperative BSs 510-1 through 510-K including the serving BS 510-1 can estimate the uplink channel of the reference MS 520 in step 507. Herein, one of the sounding signal, the existing uplink pilot signal, a newly defined uplink pilot signal, or a newly defined sounding signal can be used as the pilot. Accordingly, the cooperative BSs 510-1 through 510-K estimate the uplink channel $H_{Ml \to Bk}$ of the reference MS 520. The cooperative BSs 510-1 through 510-K estimating the uplink channel of the reference MS 520 transmit the pilot so that the reference MS 520 can estimate the downlink channel of each cooperative BS 510-1 through 510-K in step 509. Herein, the pilot can use one of the existing downlink pilot signal and a newly defined downlink pilot signal. Thus, the reference MS 520 estimates the downlink channels $H_{Bk \to Ml}$ of the cooperative BSs 510-1 through 510-K.

After the reference MS 520 and the cooperative BSs 510-1 through 510-K estimate the channel matrixes, the reference MS 520 selects a reference antenna according to the downlink channel matrixes in step 511. The reference antenna is the criterion for determining the calibration matrix. The antenna having the greatest average reception gain can be selected as the reference antenna. Alternatively, without using the downlink channel matrixes, the reference MS 520 can select a predefined antenna as the reference antenna. Upon selecting the reference antenna, the reference MS 520 feeds back information of the $l'_{Ml}$-th row of the downlink channel matrix and $l'_{Ml}$ of the cooperative BSs 510-1 through 510-K to the serving BS 510-1 in step 513.

The serving BS 510-1, upon receiving the information of the $l'_{Ml}$-th row of the downlink channel matrix and $l'_{Ml}$ of the cooperative BSs 510-1 through 510-K, transmits multi-cell sounding calibration messages to the other cooperative BSs 510-2 through 510-K in step 515. The multi-cell sounding calibration message includes information for the calibration on the antennas of the other cooperative BSs 510-2 through 510-K, for example, the index information of the reference antenna and the downlink channel information estimated by the reference MS 520. More specifically, the multi-cell sounding calibration message transmitted to the k-th cooperative BS 510-k includes the $l'_{Ml}$-th row of $H_{Bk \to Ml}$ and $l'_{Ml}$.

In step 517, the cooperative BSs 510-2 through 510-K the serving BS 510-1, upon receiving the multi-cell sounding calibration message, determine the calibration matrix based on Equation 17. After determining the calibration matrix of the reference MS 520 based on Equation 18, the serving BS 510-1 transmits the calibration matrix of the reference MS 520 to the reference MS 520 in step 519. At this time, the calibration matrix of the MSs connected to the other cooperative BSs 510-2 through 510-K than the serving BS 510-1 and communicating according to the cooperative MIMO scheme, is determined by the single-cell calibration process.

Figure 6:
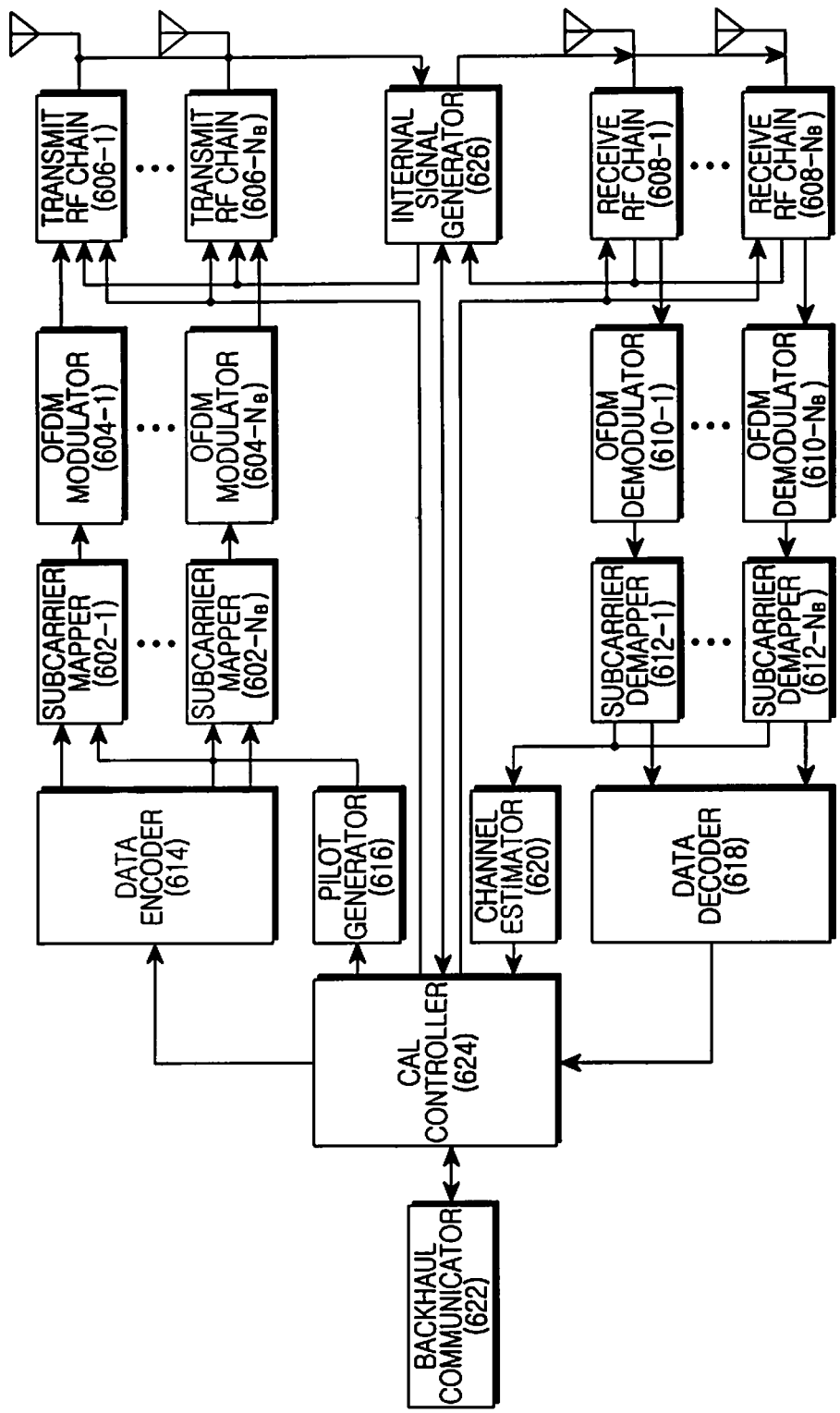
FIG. 6 is a block diagram illustrating a BS in a wireless communication system according to an embodiment of the present invention.

FIG. 6 is a block diagram of the BS in the wireless communication system according to an embodiment of the present invention.

The BS of FIG. 6 includes subcarrier mappers 602-1 through 602-$N_B$, OFDM modulators 604-1 through 604-$N_B$, transmit RF chains 606-1 through 606-$N_B$, receive RF chains 608-1 through 608-$N_B$, OFDM demodulators 610-1 through 610-$N_B$, subcarrier demappers 612-1 through 612-$N_B$, a data encoder 614, a pilot generator 616, a data decoder 618, a channel estimator 620, a backhaul communicator 622, a Calibration (CAL) controller 624, and an internal signal generator 626.

The subcarrier mappers 602-1 through 602-$N_B$ map data symbols output from the data encoder 614 and pilot symbols output from the pilot generator 616 to the frequency resources per antenna. The OFDM modulators 604-1 through 604-$N_B$ convert the symbols mapped to the frequency resources fed from the subcarrier mappers 602-1 through 602-$N_B$ to a time-domain signal through Inverse Fast Fourier Transform (IFFT), and constitute OFDM symbols by inserting Cyclic Prefix (CP). The transmit RF chains 606-1 through 606-$N_B$ convert the OFDM symbols output from the OFDM modulators 604-1 through 604-$N_B$ to an analog signal, up-convert the analog signal to an RF signal, amplify the RF signal, and then transmit the amplified signal via the antennas. More specifically, the transmit RF chains 606-1 through 606-1-$N_B$ calibrate the transmit signal by using the calibration matrix provided from the CAL controller 624, i.e., the transmit RF chains 606-1 through 606-1-$N_B$ multiply the transmit signal string and the calibration matrix and then transmit the signal.

The receive RF chains 608-1 through 608-$N_B$ amplify RF signals received over the antennas, down-convert the RF signals to baseband signals, convert them to digital signals, and output the digital signals to the OFDM demodulators 610-1 through 610-$N_B$. The OFDM demodulators 610-1 through 610-$N_B$ divide the signals output from the receive RF chains 608-1 through 608-$N_B$ to OFDM symbol units, and restore the symbols mapped to the frequency resources through CP elimination and FFT operation. The subcarrier demappers 612-1 through 612-$N_B$ extract the symbols mapped to the frequency resources as fed from the OFDM demodulators 610-1 through 610-$N_B$, and output the symbols in the processing unit. For example, the subcarrier demappers 612-1 through 612-$N_B$ provide the data symbols to the data decoder 618 and provides the pilot symbols to the channel estimator 620.

The data encoder 614 generates complex symbols by encoding and modulating traffic and control information, and outputs the generated complex symbols to the subcarrier mappers 602-1 through 602-$N_B$. The pilot generator 616 generates the pilot symbols for the downlink channel estimation of the MSs, and provides the pilot symbols to the subcarrier mappers 602-1 through 602-$N_B$. The data decoder 618 restores the traffic and the control information by demodulating and decoding the data symbols output from the subcarrier demappers 612-1 through 612-$N_B$. The channel estimator 620 estimates the uplink channel matrix with the BS by using the pilot symbols output from the subcarrier demappers 612-1 through 612-$N_B$, and provides the estimated uplink channel matrix to the CAL controller 624. The backhaul communicator 622 provides the interface for communicating with other BSs over the backhaul network.

The CAL controller 624 performs the calibration operation to obtain the reciprocity between the uplink channel and the downlink channel. The CAL controller 624 controls the multi-cell calibration for the cooperative MIMO scheme.

Herein, details of processes for performing multi-cell calibration vary according to embodiments of the present invention.

According to one embodiment of the present invention, the CAL controller 624 performs the single-cell calibration. For example, the single-cell calibration conforms to the radio signal based scheme or the internal signal based scheme. According to the radio signal based scheme, the CAL controller 624 calculates the calibration matrix based on Equation 1. According to the internal signal based scheme, the CAL controller 624 calculates the calibration matrix based on Equation 2. After calculating the calibration matrix, the CAL controller 624 selects the reference MS for the multi-cell calibration among the MSs communicating according to the cooperative MIMO scheme. For instance, the CAL controller 624 selects the MS expected to exhibit the highest channel estimation accuracy with respect to the cooperative BSs. Notably, the reference MS can be selected by other BS. In this case, the selection of the reference MS is omitted.

When the MS connected to the BS is selected as the reference MS, the CAL controller 624 determines the calibration feedback element and transmits the information of the reference MS and the calibration feedback element to the other cooperative BSs via the backhaul communicator 622. After transmitting the information of the reference MS, the CAL controller 624 generates the multi-cell sounding calibration request message to transmit to the reference MS, and provides the generated message to the data encoder 614. The CAL controller 624 provides the calibration feedback element information to the data encoder 614. The data encoder 614 generates bursts including the multi-cell sounding calibration request message and the calibration feedback element information, and provides the bursts to the subcarrier mappers 602-1 through 602-$N_B$. By contrast, when the MS connected to the other cooperative BS is selected as the reference MS, the CAL controller 624 confirms the reference MS information and the calibration feedback element information received from the serving BS of the reference MS via the backhaul communicator 622.

After transmitting the multi-cell sounding calibration request message or confirming the calibration feedback element information received from the serving BS, the CAL controller 624 controls the channel estimator 620 to estimate the uplink channel matrix by using the pilot symbols received from the reference MS, and controls the pilot generator 616 to generate the pilot symbols. Accordingly, the pilot symbols are transmitted through the subcarrier mappers 602-1 through 602-$N_B$, the OFDM modulators 604-1 through 604-$N_B$, and the transmit RF chains 606-1 through 606-$N_B$. In so doing, the transmit RF chains 606-1 through 606-$N_B$ transmit the pilot symbols by applying the single-cell calibration.

When the BS is the serving BS of the reference MS, the CAL controller 624 confirms the downlink channel information received from the reference MS. Herein, the downlink channel information is the value of the calibration feedback element or the phase value of the element. After the downlink channel information is confirmed, the CAL controller 624 generates the multi-cell calibration message including the downlink channel information, and transmits the multi-cell calibration message to the other cooperative BSs via the backhaul communicator 622. By contrast, when the BS is not the serving BS of the reference MS, the CAL controller 624 confirms the multi-cell calibration message received from the serving BS of the reference MS via the backhaul communicator 622, and confirms the downlink channel information of the reference MS contained in the multi-cell calibration message, i.e., the value of the calibration feedback element or the phase value of the element.

After the downlink channel information is confirmed, the CAL controller 624 calculates the calibration correction factor according to the uplink channel matrix information and the downlink channel information. When receiving the value of the calibration feedback element, the CAL controller 624 calculates the correction factor to match the phase and the magnitude of the calibration complex constants between the cooperative BSs. For example, the CAL controller 624 calculates the correction factor by dividing the value of the (j, i)-th element of the uplink channel matrix by the value of the calibration feedback element based on Equation 8. When receiving the phase value of the calibration feedback element, the CAL controller 624 calculates the correction factor to match the phase of the calibration complex constants between the cooperative BSs. For example, the CAL controller 624 calculates the correction factor by dividing the phase value of the (j, i)-th element of the uplink channel matrix by the phase value of the calibration feedback element based on Equation 9. When the plurality of the elements is designated as the calibration feedback element, the CAL controller 624 determines the correction factor by dividing each element or the phase value of the element fed back by the corresponding element or the phase value of the corresponding element of the downlink channel matrix of the BS and filtering the resultant values of the division. Herein, the filtering, such as equalization, for example, enhances the accuracy of the correction factor. After calculating the correction factor, the CAL controller 624 determines the multi-cell calibration matrix by using the correction factor. More specifically, by multiplying the correction factor and the single-cell calibration matrix based on Equation 10, the CAL controller 624 determines the multi-cell calibration matrix. The CAL controller 624 provides the multi-cell calibration matrix to the transmit RF chains 606-1 through 606-$N_B$.

According to another embodiment of the present invention, the CAL controller 624 performs the single-cell calibration. For example, the single-cell calibration conforms to the radio signal based scheme or the internal signal based scheme. According to the radio signal based scheme, the CAL controller 624 calculates the calibration matrix based on Equation 1. According to the internal signal based scheme, the CAL controller 624 calculates the calibration matrix based on Equation 2. After calculating the calibration matrix, the CAL controller 624 selects the reference MS for the multi-cell calibration among the MSs communicating according to the cooperative MIMO scheme. For example, the CAL controller 624 selects the MS expected to exhibit the highest channel estimation accuracy with respect to the cooperative BSs. Notably, the reference MS may be selected by other BS. In this case, the selection of the reference MS is omitted.

When the MS connected to the BS is selected as the reference MS, the CAL controller 624 transmits the reference MS information to the other cooperative BSs via the backhaul communicator 622. After transmitting the reference MS information, the CAL controller 624 generates the multi-cell sounding calibration request message to transmit to the reference MS, and provides the generated message to the data encoder 614. The CAL controller 624 provides the calibration feedback element information to the data encoder 614. The data encoder 614 generates bursts including the multi-cell sounding calibration request message and outputs the bursts to the subcarrier mappers 602-1 through 602-$N_B$. By contrast, when the MS connected to the other cooperative BS is selected as the reference MS, the CAL controller 624 confirms the reference MS information received from the serving BS of the reference MS via the backhaul communicator 622.

After transmitting the multi-cell sounding calibration request message or confirming the reference MS information received from the serving BS, the CAL controller 624 controls the channel estimator 620 to estimate the uplink channel matrix by using the pilot symbols received from the reference MS, and controls the pilot generator 616 to generate the pilot symbols. Hence, the pilot symbols are transmitted through the subcarrier mappers 602-1 through 602-N$_B$, the OFDM modulators 604-1 through 604-N$_B$, and the transmit RF chains 606-1 through 606-N$_B$. The transmit RF chains 606-1 through 606-N$_B$ transmit the pilot symbols with the single-cell calibration applied.

When the BS is the serving BS of the reference MS, the CAL controller 624 confirms the downlink channel information received from the reference MS. Herein, the downlink channel information indicates the representative value of the channel matrix acquired from the particular predefined function, or the phase value of the representative value. For example, the representative value of the downlink channel matrix is given by Equation 14. The CAL controller 624 generates the multi-cell calibration message including the downlink channel information, and transmits the multi-cell calibration message to the other cooperative BSs via the backhaul communicator 622. By contrast, when the BS is not the serving BS of the reference MS, the CAL controller 624 confirms the multi-cell calibration message received from the serving BS of the reference MS via the backhaul communicator 622, and confirms the downlink channel information of the reference MS contained in the multi-cell calibration message, i.e., the representative value of the downlink channel matrix acquired from the particular predefined function or the phase value of the representative value.

After confirming the downlink channel information of the reference MS, the CAL controller 624 calculates the calibration correction factor by using the uplink channel matrix information and the representative value of the downlink channel matrix or the phase value of the representative value. When receiving the representative value of the downlink channel matrix, the CAL controller 624 calculates the correction factor to match the phase and the magnitude of the calibration complex constants between the cooperative BSs. For example, the CAL controller 624 acquires the correction factor by calculating the representative value of the uplink channel matrix by using the particular function and dividing the representative value of the uplink channel matrix by the representative value of the downlink channel matrix. When receiving the phase value of the representative value of the downlink channel matrix, the CAL controller 624 calculates the correction factor to match the phase of the calibration complex constants between the cooperative BSs. For instance, the CAL controller 624 acquires the correction factor by calculating the representative value of the uplink channel matrix by using the particular function and dividing the phase value of the representative value of the uplink channel matrix by the phase value of the representative value of the downlink channel matrix. After acquiring the correction factor, the CAL controller 624 determines the multi-cell calibration matrix by using the correction factor, i.e., the CAL controller 624 determines the multi-cell calibration matrix by multiplying the correction factor and the single-cell calibration matrix based on Equation 10. The CAL controller 624 provides the multi-cell calibration matrix to the transmit RF chains 606-1 through 606-N$_B$.

According to still another embodiment of the present invention, the CAL controller 624 selects the reference MS for the multi-cell calibration among the MSs communicating according to the cooperative MIMO scheme. For example, the CAL controller 624 selects the MS expected to exhibit the highest channel estimation accuracy with respect to the cooperative BSs. Notably, the reference MS may be selected by other BS. In this case, the selection of the reference MS is omitted.

When the MS connected to BS is selected as the reference MS, the CAL controller 624 transmits the reference MS information to the other cooperative BSs via the backhaul communicator 622. After transmitting the reference MS information, the CAL controller 624 generates the multi-cell sounding calibration request message to transmit to the reference MS, and provides the generated message to the data encoder 614. The CAL controller 624 also provides the calibration feedback element information to the data encoder 614. The data encoder 614 generates bursts including the multi-cell sounding calibration request message, and provides the bursts to the subcarrier mappers 602-1 through 602-N$_B$. By contrast, when the MS connected to the other cooperative BS is selected as the reference MS, the CAL controller 624 confirms the reference MS information received from the serving BS of the reference MS via the backhaul communicator 622.

After transmitting the multi-cell sounding calibration request message or confirming the reference MS information received from the serving BS, the CAL controller 624 controls the channel estimator 620 to estimate the uplink channel matrix by using the pilot symbols received from the reference MS, and controls the pilot generator 616 to generate the pilot symbols. Hence, the pilot symbols are transmitted through the subcarrier mappers 602-1 through 602-N$_B$, the OFDM modulators 604-1 through 604-N$_B$, and the transmit RF chains 606-1 through 606-N$_B$.

When the BS is the serving BS of the reference MS, the CAL controller 624 confirms the downlink channel information received from the reference MS. The CAL controller 624 selects the reference antenna of the reference MS by using the downlink channel matrixes. The reference antenna is used as the criterion for determining the calibration matrix. The antenna having the greatest average reception gain can be selected as the reference antenna. The downlink channel matrixes and the uplink channel matrix estimated by the channel estimator 620 may be used together. The CAL controller 624 generates the multi-cell calibration messages including $H_{Bk \rightarrow Ml}$ and $l'_{Ml}$, or the $l'_{Ml}$-th row of $H_{Bk \rightarrow Ml}$ and $l'_{Ml}$, and transmits the multi-cell calibration messages to the other cooperative BSs via the backhaul communicator 622. By contrast, when the BS is not the serving BS of the reference MS, the CAL controller 624 confirms the multi-cell calibration message received from the serving BS of the reference MS via the backhaul communicator 622, and confirms the downlink channel information of the reference MS contained in the multi-cell calibration message, i.e., $H_{Bk \rightarrow Ml}$ and $l'_{Ml}$, or the $l'_{Ml}$-row of $H_{Bk \rightarrow Ml}$ and $l'_{Ml}$.

After confirming the downlink channel information of the reference MS, the CAL controller 624 determines the multi-cell calibration matrix by using the downlink channel information and the uplink channel matrix of the reference MS. For example, the CAL controller 624 determines the diagonal elements of the calibration matrix by dividing each element of the $l'_{Ml}$-th column of the uplink channel matrix and each element of the $l'_{Ml}$-th row of the downlink channel matrix based on Equation 17. When the BS is the serving BS of the reference MS, the CAL controller 624 determines the calibration matrix of the reference MS. For example, the CAL controller 624 determines the diagonal elements of the calibration matrix by dividing each element of the $l'_{Ml}$-th column of the downlink channel matrix and each element of the $l'_{Ml}$-th row of the uplink channel matrix based on Equation 18. The CAL controller 624 provides data indicative of the calibration matrix of the reference MS to the data encoder 614.

According to yet another embodiment of the present invention, the CAL controller 624 selects the reference MS for the multi-cell calibration among the MSs communicating according to the cooperative MIMO scheme. For example, the CAL controller 624 selects the MS expected to exhibit the highest channel estimation accuracy for the cooperative BSs. Notably, the reference MS may be selected by the other BS, In this case, the selection of the reference MS is omitted.

When the MS connected to the BS is selected as the reference MS, the CAL controller 624 transmits the reference MS information to the other cooperative BSs via the backhaul communicator 622. After transmitting the reference MS information, the CAL controller 624 generates the multi-cell sounding calibration request message to transmit to the reference MS, and provides the generated message to the data encoder 614. The CAL controller 624 also provides the calibration feedback element information to the data encoder 614. The data encoder 614 generates bursts including the multi-cell sounding calibration request message and outputs the bursts to the subcarrier mappers 602-1 through 602-$N_B$. By contrast, when the MS connected to the other cooperative BS is selected as the reference MS, the CAL controller 624 confirms the reference MS information received from the serving BS of the reference MS via the backhaul communicator 622.

After transmitting the multi-cell sounding calibration request message or confirming the reference MS information received from the serving BS, the CAL controller 624 controls the channel estimator 620 to estimate the uplink channel matrix by using the pilot symbols received from the reference MS, and controls the pilot generator 616 to generate the pilot symbols. The pilot symbols are transmitted through the subcarrier mappers 602-1 through 602-$N_B$, the OFDM modulators 604-1 through 604-$N_B$, and the transmit RF chains 606-1 through 606-$N_B$.

When the BS is the serving BS of the reference MS, the CAL controller 624 confirms the downlink channel information received from the reference MS. Herein, the downlink channel information indicates the $l'_{Ml}$-th row of the downlink channel matrix $H_{Bk \to Ml}$ and $l'_{Ml}$. The CAL controller 624 generates the multi-cell calibration messages including the $l'_{Ml}$-th row of $H_{Bk \to Ml}$ and $l'_{Ml}$, and transmits the multi-cell calibration messages to the other cooperative BSs via the backhaul communicator 622. By contrast, when the BS is not the serving BS of the reference MS, the CAL controller 624 confirms the multi-cell calibration message received from the serving BS of the reference MS via the backhaul communicator 622, and confirms the downlink channel information of the reference MS contained in the multi-cell calibration message, i.e., the $l'_{Ml}$-th row of $H_{Bk \to Ml}$ and $l'_{Ml}$.

After confirming the downlink channel information of the reference MS, using the downlink channel information and the uplink channel matrix for the reference MS, the CAL controller 624 determines the multi-cell calibration matrix. For example, the CAL controller 624 determines the diagonal elements of the calibration matrix by dividing each element of the $l'_{Ml}$-th column of the uplink channel matrix and each element of the $l'_{Ml}$-th row of the downlink channel matrix based on Equation 17. When the BS is the serving BS of the reference MS, the CAL controller 624 determines the calibration matrix of the reference MS. For example, the CAL controller 624 determines the diagonal elements of the calibration matrix by dividing each element of the $l'_{Ml}$-th column of the downlink channel matrix and each element of the $l'_{Ml}$-th row of the uplink channel matrix based on Equation 18. The CAL controller 624 provides data indicative of the calibration matrix of the reference MS to the data encoder 614.

The internal signal generator 626 issues the internal signal for the single-cell calibration, and measures the channel value of the transmit RF chains 606-1 through 606-$N_B$ and the receive RF chains 608-1 through 608-$N_B$. The internal signal generator 626 provides the channel value of the transmit RF chains 606-1 through 606-$N_B$ and the receive RF chains 608-1 through 608-$N_B$ to the CAL controller 624. Yet, the internal signal generator 626 is required for the single-cell calibration based on the internal signal. When the BS supports only the single-cell calibration based on the external signal, the internal signal generator 626 is not provided.

Figure 7:
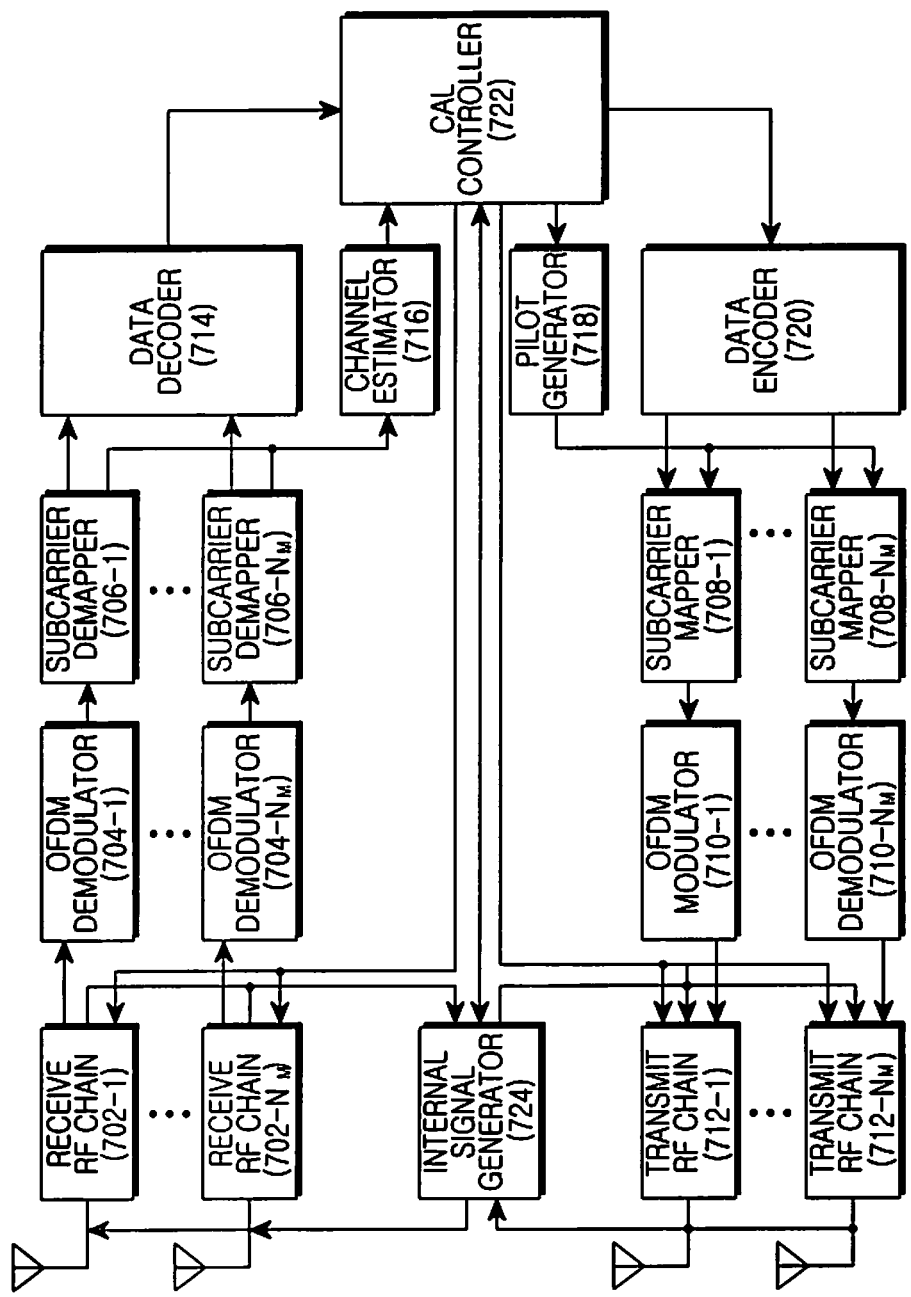
FIG. 7 is a block diagram illustrating an MS in a wireless communication system according to an embodiment of the present invention.

FIG. 7 is a block diagram of the MS in the wireless communication system according to an embodiment of the present invention.

The MS of FIG. 7 includes receive RF chains 702-1 through 702-$N_M$, OFDM demodulators 704-1 through 704-$N_M$, subcarrier demappers 706-1 through 706-$N_M$, subcarrier mappers 708-1 through 708-$N_M$, OFDM modulators 710-1 through 710-$N_M$, transmit RF chains 712-1 through 712-$N_M$, a data decoder 714, a channel estimator 716, a pilot generator 718, a data encoder 720, a CAL controller 722, and an internal signal generator 724.

The receive RF chains 702-1 through 702-$N_M$ amplify RF signals received over the antennas, down-convert the RF signals to baseband signals, convert to digital signals, and provide the digital signals to the OFDM demodulators 704-1 through 704-$N_M$. The OFDM demodulators 704-1 through 704-$N_M$ divide the signals output from the receive RF chains 702-1 through 702-$N_M$ in the OFDM symbol units, and restore the symbols mapped to the frequency resources through the CP elimination and the FFT operation. The subcarrier demappers 706-1 through 706-$N_M$ extract the symbols mapped to the frequency resources output from the OFDM demodulators 704-1 through 704-$N_M$, and output the extracted symbols in the processing unit. For example, the subcarrier demappers 706-1 through 706-$N_M$ provide the data symbols to the data decoder 714 and provide the pilot symbols to the channel estimator 716.

The subcarrier mappers 708-1 through 708-$N_M$ map the data symbols output from the data encoder 720 and the pilot symbols output from the pilot generator 718 to the frequency resources per antenna. The OFDM modulators 710-1 through 710-$N_M$ convert the symbols mapped to the frequency resources, which are output from the subcarrier mappers 708-1 through 708-$N_M$, to a time-domain signal using the IFFT operation, and generates OFDM symbols by inserting the CP. The transmit RF chains 712-1 through 712-$N_M$ convert the OFDM symbols output from the OFDM modulators 710-1 through 710-$N_M$ to an analog signal, up-convert the analog signal to an RF signal, amplify the RF signal, and then transmit the amplified RF signal via the antennas. More specifically, the transmit RF chains 712-1 through 712-$N_M$ calibrate the transmit signal by using the calibration matrix provided from the CAL controller 722, i.e., after multiplying the transmit signal string and the calibration matrix, the transmit RF chains 712-1 through 712-$N_M$ transmit the signal.

The data decoder 714 restores the traffic and the control information by demodulating and decoding the data symbols output from the subcarrier demappers 706-1 through 706-$N_M$. The channel estimator 716 estimates the uplink channel matrix with the BS by using the pilot symbols output from the subcarrier demappers 706-1 through 706-$N_M$, and provides the estimated uplink channel matrix to the CAL controller 722. The pilot generator 718 generates the pilot symbols for the downlink channel estimation of the MSs, and provides the pilot symbols to the subcarrier mappers 708-1 through 708-$N_M$. The data encoder 720 generates complex symbols by encoding and modulating the traffic and the control information, and provides the generated complex symbols to the subcarrier mappers 708-1 through 708-$N_M$.

The CAL controller 722 performs the calibration to obtain the reciprocity between the uplink channel and the downlink channel. The CAL controller 722 controls the multi-cell calibration for the cooperative MIMO scheme. Herein, details of processes for performing multi-cell calibration vary according to embodiments of the present invention.

According to one embodiment of the present invention, the CAL controller 722 performs the single-cell calibration. For example, the single-cell calibration conforms to the radio signal based scheme or the internal signal based scheme. According to the radio signal based scheme, the CAL controller 722 calculates the calibration matrix based on Equation 1. According to the internal signal based scheme, the CAL controller 722 calculates the calibration matrix based on Equation 2. Without calculating the calibration matrix by itself, the CAL controller 722 can use the calibration matrix calculated by the BS. When the data decoder 714 confirms the reception of the multi-cell sounding calibration request message and the calibration feedback element information from the serving BS, the CAL controller 722 controls the pilot generator 718 to generate the pilot symbols. The pilot symbols are transmitted through the subcarrier mappers 708-1 through 708-$N_M$, the OFDM modulators 710-1 through 710-$N_M$, and the transmit RF chains 712-1 through 712-$N_M$. The transmit RF chains 712-1 through 712-$N_M$ transmit the pilot symbols by applying the single-cell calibration. After the single-cell calibration is applied, the CAL controller 722 controls the channel estimator 716 to estimate the uplink channel matrix by using the pilot symbols received from the cooperative BSs. After estimating the downlink channel matrixes for the cooperative BSs, the CAL controller 722 provides the data encoder 720 with the data indicating the (i, j)-th elements designated as the calibration feedback element in the downlink channel matrixes of the cooperative BSs. Hence, the (i, j)-th elements designated as the calibration feedback element in the downlink channel matrixes are transmitted through the data encoder 720, the subcarrier mappers 708-1 through 708-$N_M$, the OFDM modulators 710-1 through 710-$N_M$, and the transmit RF chains 712-1 through 712-$N_M$. To match only the phase of the calibration complex constants through the calibration for the cooperative MIMO, the CAL controller 722 provides the phase values of the (i, j)-th elements.

According to another embodiment of the present invention, the CAL controller 722 performs the single-cell calibration. For example, the single-cell calibration conforms to the radio signal based scheme or the internal signal based scheme. According to the radio signal based scheme, the CAL controller 722 calculates the calibration matrix based on Equation 1. According to the internal signal based scheme, the CAL controller 722 calculates the calibration matrix based on Equation 2. Without calculating the calibration matrix by itself, the CAL controller 722 can use the calibration matrix calculated by the BS. When the data decoder 714 confirms the reception of the multi-cell sounding calibration request message from the serving BS, the CAL controller 722 controls the pilot generator 718 to generate the pilot symbols. The pilot symbols are transmitted through the subcarrier mappers 708-1 through 708-$N_M$, the OFDM modulators 710-1 through 710-$N_M$, and the transmit RF chains 712-1 through 712-$N_M$. The transmit RF chains 712-1 through 712-$N_M$ transmit the pilot symbols by applying the single-cell calibration. After the single-cell calibration is applied, the CAL controller 722 controls the channel estimator 716 to estimate the uplink channel matrix by using the pilot symbols received from the cooperative BSs. After estimating the downlink channel matrixes for the cooperative BSs, the CAL controller 722 calculates the representative values of the downlink channel matrixes of the cooperative BSs by using the particular predefined function, and provides data indicating the representative values to the data encoder 720. For example, the particular predefined function is given by Equation 14. Accordingly, the representative values are transmitted through the data encoder 720, the subcarrier mappers 708-1 through 708-$N_M$, the OFDM modulators 710-1 through 710-$N_M$, and the transmit RF chains 712-1 through 712-$N_M$. To match only the phase of the calibration complex constants through the calibration for the cooperative MIMO, the CAL controller 722 provides the phase values of the representative values.

According to still another embodiment of the present invention, when the data decoder 714 confirms the reception of the multi-cell sounding calibration request message from the serving BS, the CAL controller 722 controls the pilot generator 718 to generate the pilot symbols. Herein, the pilot symbols are transmitted through the subcarrier mappers 708-1 through 708-$N_M$, the OFDM modulators 710-1 through 710-$N_M$, and the transmit RF chains 712-1 through 712-$N_M$. After the pilot symbols are transmitted, the CAL controller 722 controls the channel estimator 716 to estimate the uplink channel matrix by using the pilot symbols received from the cooperative BSs. After estimating the downlink channel matrixes for the cooperative BSs, the CAL controller 722 provides data indicating the downlink channel matrixes of the cooperative BSs to the data encoder 720. Accordingly, the downlink channel matrixes are transmitted through the data encoder 720, the subcarrier mappers 708-1 through 708-$N_M$, the OFDM modulators 710-1 through 710-$N_M$, and the transmit RF chains 712-1 through 712-$N_M$. Upon receiving the calibration matrix of the MS from the serving BS, the CAL controller 722 provides the calibration matrix to the transmit RF chains 712-1 through 712-$N_M$.

According to yet another embodiment of the present invention, when the data decoder 714 confirms the reception of the multi-cell sounding calibration request message from the serving BS, the CAL controller 722 controls the pilot generator 718 to generate the pilot symbols. Herein, the pilot symbols are transmitted through the subcarrier mappers 708-1 through 708-$N_M$, the OFDM modulators 710-1 through 710-$N_M$, and the transmit RF chains 712-1 through 712-$N_M$. After the pilot symbols are transmitted, the CAL controller 722 controls the channel estimator 716 to estimate the uplink channel matrix by using the pilot symbols received from the cooperative BSs. After estimating the downlink channel matrixes for the cooperative BSs, the CAL controller 722 selects the reference antenna by using the downlink channel matrixes. The reference antenna is used as the criterion for determining the calibration matrix. The antenna having the greatest average reception gain can be selected as the reference antenna. Alternatively, without using the downlink channel matrixes, the CAL controller 722 can select a predefined antenna as the reference antenna. After the reference antenna is selected, the CAL controller 722 provides the data indicating the $l'_{MI}$-th row of the downlink channel matrix and $l'_{MI}$ of the cooperative BSs to the data encoder 720. The $l'_{MI}$-th row of the downlink channel matrix and $l'_{MI}$ of the cooperative BSs are transmitted through the data encoder 720, the subcarrier mappers 708-1 through 708-$N_M$, the OFDM modulators 710-1 through 710-$N_M$, and the transmit RF chains 712-1 through 712-$N_M$. Upon receiving the calibration matrix of the MS from the serving BS, the CAL controller 722 provides the calibration matrix to the transmit RF chains 712-1 through 712-$N_M$.

In the wireless communication system supporting the cooperative MIMO, the calibration correction factor between the cells is set to the same. Therefore, the BS participating in the cooperative MIMO attains the channel information of the MS through the sounding without overhead, and the performance of the cooperative MIMO is enhanced.

Although embodiments the present invention have been described, various changes and modifications may be made therein without departing from the spirit and scope of the invention. The present invention encompasses such changes and modifications in accordance with the scope of the appended claims.

What is claimed is:

1. A method of a Base Station (BS) for performing calibration in a wireless communication system supporting cooperative Multiple Input Multiple Output (MIMO) communication, the method comprising:
   transmitting a first message indicating a start of multi-cell sounding calibration from the BS to a reference Mobile Station (MS);
   receiving MS pilot symbols at the BS from the reference MS;
   estimating an uplink channel matrix of the reference MS using the MS pilot symbols received from the reference MS;
   transmitting BS pilot symbols, from the BS to the reference MS, which enables the reference MS to estimate a downlink channel matrix;
   receiving downlink channel information of the BS and cooperative BSs at the BS from the reference MS;
   transmitting second messages including the downlink channel information from the BS to the cooperative BS; and
   determining, at the BS, a multi-cell calibration matrix using the uplink channel matrix and the downlink channel information received from the reference MS.

2. The method of claim 1, wherein the downlink channel information includes an (i, j)-th element designated for the multi-cell sounding calibration among elements of the downlink channel matrix, and
   wherein determining the multi-cell calibration matrix comprises:
   calculating a correction factor by dividing a (j, i)-th element of the uplink channel matrix by the (i, j)-th element of the downlink channel matrix; and
   determining the multi-cell calibration matrix by multiplying the correction factor and a single-cell calibration matrix determined by single-cell calibration.

3. The method of claim 1, wherein the downlink channel information includes a plurality of elements designated for the multi-cell sounding calibration among elements of the downlink channel matrix, and
   wherein determining the multi-cell calibration matrix comprises:
   calculating a correction factor by dividing elements of the uplink channel matrix by corresponding elements of the downlink channel matrix respectively and filtering resultant values of the division; and
   determining the multi-cell calibration matrix by multiplying the correction factor and a single-cell calibration matrix determined by single-cell calibration.

4. The method of claim 1, wherein the downlink channel information includes a phase value of an (i, j)-th element designated for the multi-cell sounding calibration among elements of the downlink channel matrix, and
   wherein determining the multi-cell calibration matrix comprises:
   calculating a correction factor by dividing a phase value of a (j, i)-th element of the uplink channel matrix by the phase value of the (i, j)-th element of the downlink channel matrix; and
   determining the multi-cell calibration matrix by multiplying the correction factor and a single-cell calibration matrix determined by single-cell calibration.

5. The method of claim 1, wherein the downlink channel information includes phase values of a plurality of elements designated for the multi-cell sounding calibration among elements of the downlink channel matrix, and
   wherein determining the multi-cell calibration matrix comprises:
   calculating a correction factor by dividing phase values of elements of the uplink channel matrix by phase values of corresponding elements of the downlink channel matrix respectively and filtering resultant values of the division; and
   determining the multi-cell calibration matrix by multiplying the correction factor and a single-cell calibration matrix determined by single-cell calibration.

6. The method of claim 1, wherein the downlink channel information includes a representative value of the downlink channel matrix acquired using a particular predefined function, and
   wherein determining the multi-cell calibration matrix comprises:
   calculating a representative value of the uplink channel matrix using the particular function;
   calculating a correction factor by dividing the representative value of the uplink channel matrix by the representative value of the downlink channel matrix; and
   determining the multi-cell calibration matrix by multiplying a single-cell calibration matrix determined by single-cell calibration by the correction factor.

7. The method of claim 1, wherein the downlink channel information includes a phase value of a representative value of the downlink channel matrix acquired using a particular predefined function, and
   wherein determining the multi-cell calibration matrix comprises:
   calculating a representative value of the uplink channel matrix using the particular function;
   calculating a correction factor by dividing the phase value of the representative value of the uplink channel matrix by the phase value of the representative value of the downlink channel matrix; and
   determining the multi-cell calibration matrix by multiplying the correction factor and a single-cell calibration matrix determined by single-cell calibration.

8. The method of claim 1, wherein the downlink channel information includes an l-th row corresponding to a reference antenna of the reference MS in the downlink channel matrix, or the downlink channel matrix and an index of the reference antenna, and
   wherein determining the multi-cell calibration matrix comprises calculating diagonal elements of the multi-cell calibration matrix by dividing elements of an l-th column of the uplink channel matrix and elements of an l-th row of the downlink channel matrix.

9. The method of claim 8, further comprising:
calculating the diagonal elements of the multi-cell calibration matrix of the reference MS by dividing elements of an 1-th column of the downlink channel matrix and elements of an 1-th row of the uplink channel matrix; and
transmitting, to the reference MS, the multi-cell calibration matrix of the reference MS including the diagonal elements.

10. The method of claim 1, wherein determining the multi-cell calibration matrix comprises:
calculating a correction factor using the uplink channel matrix and the downlink channel information received from the reference MS; and
determining the multi-cell calibration matrix by multiplying the correction factor and a single-cell calibration matrix determined by single-cell calibration.

11. A method of a Base Station (BS) for performing calibration in a wireless communication system supporting cooperative Multiple Input Multiple Output (MIMO) communication, the method comprising:
receiving information of a reference Mobile Station (MS) at the BS from a serving BS of the reference MS;
receiving MS pilot symbols at the BS from the reference MS;
estimating an uplink channel matrix of the reference MS using the MS pilot symbols received at the BS from the reference MS;
transmitting BS pilot symbols, from the BS to the reference MS, which enables the reference MS to estimate a downlink channel matrix;
receiving a message comprising downlink channel information fed back from the reference MS, at the BS from the serving BS; and
determining a multi-cell calibration matrix using the uplink channel matrix and the downlink channel information.

12. The method of claim 11, wherein the downlink channel information includes an (i, j)-th element designated for a multi-cell calibration among elements of the downlink channel matrix, and
wherein determining the multi-cell calibration matrix comprises:
calculating a correction factor by dividing a (j, i)-th element of the uplink channel matrix by the (i, j)-th element of the downlink channel matrix; and
determining the multi-cell calibration matrix by multiplying the correction factor and a single-cell calibration matrix determined by single-cell calibration.

13. The method of claim 11, wherein the downlink channel information includes a plurality of elements designated for a multi-cell calibration among elements of the downlink channel matrix, and
wherein determining the multi-cell calibration matrix comprises:
calculating a correction factor by dividing elements of the uplink channel matrix by corresponding elements of the downlink channel matrix respectively and filtering resultant values of the division; and
determining the multi-cell calibration matrix by multiplying the correction factor and a single-cell calibration matrix determined by single-cell calibration.

14. The method of claim 11, wherein the downlink channel information includes a phase value of an (i, j)-th element designated for a multi-cell calibration among elements of the downlink channel matrix, and wherein determining the multi-cell calibration matrix comprises:
calculating a correction factor by dividing a phase value of a (j, i)-th element of the uplink channel matrix by the phase value of the (i, j)-th element of the downlink channel matrix; and
determining the multi-cell calibration matrix by multiplying the correction factor and a single-cell calibration matrix determined by single-cell calibration.

15. The method of claim 11, wherein the downlink channel information includes phase values of a plurality of elements designated for a multi-cell calibration among elements of the downlink channel matrix, and
wherein determining the multi-cell calibration matrix comprises:
calculating a correction factor by dividing phase values of elements of the uplink channel matrix by phase values of corresponding elements of the downlink channel matrix respectively and filtering resultant values of the division; and
determining the multi-cell calibration matrix by multiplying the correction factor and a single-cell calibration matrix determined by single-cell calibration.

16. The method of claim 11, wherein the downlink channel information includes a representative value of the downlink channel matrix acquired using a particular predefined function, and
wherein determining the multi-cell calibration matrix comprises:
calculating a representative value of the uplink channel matrix using the particular function;
calculating a correction factor by dividing the representative value of the uplink channel matrix by the representative value of the downlink channel matrix; and
determining the multi-cell calibration matrix by multiplying the correction factor and a single-cell calibration matrix determined by single-cell calibration.

17. The method of claim 11, wherein the downlink channel information includes a phase value of a representative value of the downlink channel matrix acquired using a particular predefined function, and
wherein determining the multi-cell calibration matrix comprises:
calculating a representative value of the uplink channel matrix using the particular function;
calculating a correction factor by dividing the phase value of the representative value of the uplink channel matrix by the phase value of the representative value of the downlink channel matrix; and
determining the multi-cell calibration matrix by multiplying the correction factor and a single-cell calibration matrix determined by single-cell calibration.

18. The method of claim 11, wherein the downlink channel information includes an 1-th row corresponding to a reference antenna of the reference MS in the downlink channel matrix, or the downlink channel matrix and an index of the reference antenna, and
determining the multi-cell calibration matrix comprises calculating diagonal elements of the multi-cell calibration matrix by dividing elements of an 1-th column of the uplink channel matrix and elements of an 1-th row of the downlink channel matrix.

19. The method of claim 11, wherein determining the multi-cell calibration matrix comprises:
calculating a correction factor using the uplink channel matrix and the downlink channel information received from the reference MS; and determining the multi-cell calibration matrix by multiplying the correction factor and a single-cell calibration matrix determined by single-cell calibration.

20. An operating method of a Mobile Station (MS) for multi-cell calibration in a wireless communication system supporting cooperative Multiple Input Multiple Output (MIMO) communication, comprising:
receiving a message indicating a start of multi-cell sounding calibration at the MS from a serving Base Station (BS);
transmitting MS pilot symbols from the MS to cooperative BSs for enabling the cooperative BSs to estimate an uplink channel matrix, wherein the cooperative BSs include the serving BS;
receiving BS pilot symbols at the MS from the cooperative BSs;
estimating downlink channel matrixes of the cooperative BSs using the BS pilot symbols received from the cooperative BSs; and
transmitting downlink channel information from the MS to the serving BS.

21. The operating method of claim 20, wherein the downlink channel information includes one of the downlink channel matrix, an (i, j)-th element designated for the multi-cell sounding calibration in elements of the downlink channel matrix, a phase value of the (i, j)-th element, a plurality of elements designated for the multi-cell sounding calibration in the elements of the downlink channel matrix, phase values of the plurality of the elements, a representative value of the downlink channel matrix calculated using a particular predefined function, a phase value of the representative value, an 1-th row corresponding to a reference antenna of a reference MS in the downlink channel matrix, and the downlink channel matrix and an index of the reference antenna.

22. A Base Station (BS) apparatus in a wireless communication system supporting cooperative Multiple Input Multiple Output (MIMO) communication, the apparatus comprising:
a transmitter for transmitting a first message indicating a start of multi-cell sounding calibration to a reference Mobile Station (MS), and transmitting BS pilot symbols for enabling the reference MS to estimate a downlink channel matrix;
an estimator for estimating an uplink channel matrix of the reference MS using MS pilot symbols received from the reference MS;
a backhaul communicator for, when receiving downlink channel information of the BS and cooperative BSs from the reference MS, transmitting second messages including the downlink channel information to the cooperative BSs; and
a controller for determining a multi-cell calibration matrix using the uplink channel matrix and the downlink channel information received from the reference MS.

23. The apparatus of claim 22, wherein the downlink channel information includes an (i, j)-th element designated for the multi-cell sounding calibration among elements of the downlink channel matrix, and
wherein the controller calculates a correction factor by dividing a (j, i)-th element of the uplink channel matrix by the (i, j)-th element of the downlink channel matrix, and determines the multi-cell calibration matrix by multiplying the correction factor and a single-cell calibration matrix determined by single-cell calibration.

24. The apparatus of claim 22, wherein the downlink channel information includes a plurality of elements designated for the multi-cell sounding calibration among elements of a downlink channel matrix, and
wherein the controller calculates a correction factor by dividing elements of the uplink channel matrix by corresponding elements of the downlink channel matrix respectively and filtering resultant values of the division, and determines the multi-cell calibration matrix by multiplying the correction factor and a single-cell calibration matrix determined by single-cell calibration.

25. The apparatus of claim 22, wherein the downlink channel information includes a phase value of an (i, j)-th element designated for the multi-cell sounding calibration among elements of the downlink channel matrix, and
wherein the controller calculates a correction factor by dividing a phase value of a (j, i)-th element of the uplink channel matrix by the phase value of the (i, j)-th element of the downlink channel matrix, and determines the multi-cell calibration matrix by multiplying the correction factor and a single-cell calibration matrix determined by single-cell calibration.

26. The apparatus of claim 22, wherein the downlink channel information includes phase values of a plurality of elements designated for the multi-cell sounding calibration among elements of the downlink channel matrix, and
wherein the controller calculates a correction factor by dividing phase values of elements of the uplink channel matrix by phase values of corresponding elements of the downlink channel matrix respectively and filtering resultant values of the division, and determines the multi-cell calibration matrix by multiplying the correction factor and a single-cell calibration matrix determined by single-cell calibration.

27. The apparatus of claim 22, wherein the downlink channel information includes a representative value of the downlink channel matrix acquired using a particular predefined function, and
wherein the controller calculates a representative value of the uplink channel matrix using the particular function, calculates a correction factor by dividing the representative value of the uplink channel matrix by the representative value of the downlink channel matrix, and determines the multi-cell calibration matrix by multiplying the correction factor and a single-cell calibration matrix determined by single-cell calibration.

28. The apparatus of claim 22, wherein the downlink channel information includes a phase value of a representative value of the downlink channel matrix acquired using a particular predefined function, and
wherein the controller calculates a representative value of the uplink channel matrix using the particular function, calculates a correction factor by dividing the phase value of the representative value of the uplink channel matrix by the phase value of the representative value of the downlink channel matrix, and determines the multi-cell calibration matrix by multiplying the correction factor and a single-cell calibration matrix determined by single-cell calibration.

29. The apparatus of claim 22, wherein the downlink channel information includes an 1-th row corresponding to a reference antenna of the reference MS in the downlink channel matrix, or the downlink channel matrix and an index of the reference antenna, and
wherein the controller calculates diagonal elements of the multi-cell calibration matrix by dividing elements of an 1-th column of the uplink channel matrix and elements of an 1-th row of the downlink channel matrix.

30. The apparatus of claim 29, wherein the controller calculates the diagonal elements of the multi-cell calibration matrix of the reference MS by dividing elements of an 1-th column of the downlink channel matrix and elements of an 1-th row of the uplink channel matrix, and the transmitter transmits the multi-cell calibration matrix of the reference MS including the diagonal elements to the reference MS.

31. The apparatus of claim 22, wherein the controller calculates a correction factor using the uplink channel matrix and the downlink channel information received from the reference MS, and determines the multi-cell calibration matrix by multiplying the correction factor and a single-cell calibration matrix determined by single-cell calibration.

32. A Base Station (BS) apparatus in a wireless communication system supporting cooperative Multiple Input Multiple Output (MIMO) communication, the apparatus comprising:

a backhaul communicator for receiving information of a reference Mobile Station (MS) from a serving BS of the reference MS;

an estimator for estimating an uplink channel matrix of the reference MS using MS pilot symbols received from the reference MS;

a transmitter for transmitting BS pilot symbols to the reference MS for enabling the reference MS to estimate a downlink channel matrix; and a controller for, when receiving a message including downlink channel information fed back from the reference MS, from the serving BS, determining a multi-cell calibration matrix using the uplink channel matrix and the downlink channel information.

33. The apparatus of claim 32, wherein the downlink channel information includes an (i, j)-th element designated for multi-cell calibration among elements of the downlink channel matrix, and wherein the controller calculates a correction factor by dividing a (j, i)-th element of the uplink channel matrix by the (i, j)-th element of the downlink channel matrix, and determines the multi-cell calibration matrix by multiplying the correction factor and a single-cell calibration matrix determined by single-cell calibration.

34. The apparatus of claim 32, wherein the downlink channel information includes a plurality of elements designated for multi-cell calibration among elements of the downlink channel matrix, and wherein the controller calculates a correction factor by dividing elements of the uplink channel matrix by corresponding elements of the downlink channel matrix respectively and filtering resultant values of the division, and determines the multi-cell calibration matrix by multiplying the correction factor and a single-cell calibration matrix determined by single-cell calibration.

35. The apparatus of claim 32, wherein the downlink channel information includes a phase value of an (i, j)-th element designated for multi-cell calibration among elements of the downlink channel matrix, and wherein the controller calculates a correction factor by dividing a phase value of a (j, i)-th element of the uplink channel matrix by the phase value of the (i, j)-th element of the downlink channel matrix, and determines the multi-cell calibration matrix by multiplying the correction factor and a single-cell calibration matrix determined by single-cell calibration.

36. The apparatus of claim 32, wherein the downlink channel information includes phase values of a plurality of elements designated for multi-cell calibration among elements of the downlink channel matrix, and wherein the controller calculates a correction factor by dividing phase values of elements of the uplink channel matrix by phase values of corresponding elements of the downlink channel matrix respectively and filtering resultant values of the division, and determines the multi-cell calibration matrix by multiplying the correction factor and a single-cell calibration matrix determined by single-cell calibration.

37. The apparatus of claim 32, wherein the downlink channel information includes a representative value of the downlink channel matrix acquired using a particular predefined function, and wherein the controller calculates a representative value of the uplink channel matrix using the particular function, calculates a correction factor by dividing the representative value of the uplink channel matrix by the representative value of the downlink channel matrix, and determines the multi-cell calibration matrix by multiplying the correction factor and a single-cell calibration matrix determined by single-cell calibration.

38. The apparatus of claim 32, wherein the downlink channel information includes a phase value of a representative value of the downlink channel matrix acquired using a particular predefined function, and wherein the controller calculates a representative value of the uplink channel matrix using the particular function, calculates a correction factor by dividing the phase value of the representative value of the uplink channel matrix by the phase value of the representative value of the downlink channel matrix, and determines the multi-cell calibration matrix by multiplying the correction factor and a single-cell calibration matrix determined by single-cell calibration.

39. The apparatus of claim 32, wherein the downlink channel information includes an 1-th row corresponding to a reference antenna of the reference MS in the downlink channel matrix, or the downlink channel matrix and an index of the reference antenna, and wherein the controller calculates diagonal elements of the multi-cell calibration matrix by dividing elements of an 1-th column of the uplink channel matrix and elements of an 1-th row of the downlink channel matrix.

40. The apparatus of claim 32, wherein the controller calculates a correction factor using the uplink channel matrix and the downlink channel information received from the reference MS, and determines the multi-cell calibration matrix by multiplying the correction factor and a single-cell calibration matrix determined by single-cell calibration.

41. A Mobile Station (MS) apparatus in a wireless communication system supporting cooperative Multiple Input Multiple Output (MIMO) communication, comprising:

a receiver for receiving a message indicating a start of multi-cell sounding calibration from a serving Base Station (BS), and BS pilot symbols from cooperative BSs, wherein the cooperative BSs include the serving BS;

a transmitter for transmitting MS pilot symbols to the cooperative BSs for enabling the cooperative BSs to estimate an uplink channel matrix;

an estimator for estimating downlink channel matrixes of the cooperative BSs using the BS pilot symbols received from the cooperative BSs; and a controller for controlling to transmit downlink channel information to the serving BS.

42. The apparatus of claim 41, wherein the downlink channel information is one of the downlink channel matrix, an (i, j)-th element designated for the multi-cell sounding calibration in elements of the downlink channel matrix, a phase value of the (i, j)-th element, a plurality of elements designated for the multi-cell sounding calibration in the elements of the downlink channel matrix, phase values of the plurality of the elements, a representative value of the downlink channel matrix calculated using a particular predefined function, a phase value of the representative value, an 1-th row corresponding to a reference antenna of a reference MS in the downlink channel matrix, and the downlink channel matrix and an index of the reference antenna.

\* \* \* \* \*